US009588987B2

(12) United States Patent
Wailes et al.

(10) Patent No.: US 9,588,987 B2
(45) Date of Patent: Mar. 7, 2017

(54) METHOD AND SYSTEM FOR NAVIGATING A MAP

(75) Inventors: Thomas Wailes, Sunnyvale, CA (US); Gareth J. Finucane, San Francisco, CA (US); Michael J. Lawless, Oakland, CA (US); Mark E. Wehner, Mountain View, CA (US); Rodney J. Fernandez, Cupertino, CA (US)

(73) Assignee: Jollify Management Limited, Tortola (VG)

( * ) Notice: Subject to any disclaimer, the term of this patent is extended or adjusted under 35 U.S.C. 154(b) by 1899 days.

(21) Appl. No.: 11/580,776

(22) Filed: Oct. 13, 2006

(65) Prior Publication Data

US 2007/0156332 A1    Jul. 5, 2007

Related U.S. Application Data

(60) Provisional application No. 60/727,206, filed on Oct. 14, 2005.

(51) Int. Cl.
*G08B 29/10* (2006.01)
*G01C 21/36* (2006.01)
(Continued)

(52) U.S. Cl.
CPC ..... *G06F 17/30241* (2013.01); *G01C 21/343* (2013.01); *G01C 21/3676* (2013.01); *G09B 29/007* (2013.01); *G09B 29/106* (2013.01)

(58) Field of Classification Search
CPC G01C 21/343; G01C 21/367; G01C 21/3676; G06F 17/30241; G09B 29/007; G09B 29/106
(Continued)

(56) References Cited

U.S. PATENT DOCUMENTS 5,559,707 A * 9/1996 DeLorme et al. ............ 701/467
5,802,492 A 9/1998 DeLorme et al.
(Continued)

FOREIGN PATENT DOCUMENTS

JP    2000-010471    1/2000
JP    2000-010475    1/2000
(Continued)

OTHER PUBLICATIONS

International Search Report and Written Opinion mailed Jan. 22, 2008, for PCT Application No. PCT/US06/19223, 10 pages.
(Continued)

*Primary Examiner* — Khoi Tran
*Assistant Examiner* — Dale Moyer

(57) ABSTRACT

Method and computer program product for navigating a map in a browser window of a user device via the Internet are disclosed. The method includes providing a first map for showing geographic context of a general area, providing a second map for showing geographic context of a portion of the general area, superimposing the second map onto the first map, wherein the second map is represented by a highlighted area in the first map, and navigating the first map using the highlighted area. The method further includes displaying points of interest inside the highlighted area of the first map and in the second map for assisting a user in navigating to the points of interest, and displaying additional points of interest outside the shaded area of the first map for assisting a user in navigating to the additional points of interest.

14 Claims, 29 Drawing Sheets
(29 of 29 Drawing Sheet(s) Filed in Color)

(51) Int. Cl.
*G09B 29/00* (2006.01)
*G01C 21/34* (2006.01)
*G06F 17/30* (2006.01)
*G09B 29/10* (2006.01)

(58) Field of Classification Search
USPC .............................. 340/995.1; 701/208, 211
See application file for complete search history.

(56) References Cited

U.S. PATENT DOCUMENTS

| | | | |
|---|---|---|---|
| 5,818,455 A | 10/1998 | Stone et al. | |
| 5,864,305 A * | 1/1999 | Rosenquist | 701/208 |
| 5,874,905 A * | 2/1999 | Nanba et al. | 701/211 |
| 5,884,218 A | 3/1999 | Nimura et al. | |
| 5,904,727 A * | 5/1999 | Prabhakaran | 701/208 |
| 6,144,318 A * | 11/2000 | Hayashi et al. | 701/202 |
| 6,148,260 A | 11/2000 | Musk et al. | |
| 6,202,026 B1 * | 3/2001 | Nimura et al. | 701/455 |
| 6,240,360 B1 | 5/2001 | Phelan | |
| 6,297,748 B1 | 10/2001 | Lappenbusch et al. | |
| 6,307,573 B1 | 10/2001 | Barros | |
| 6,321,158 B1 | 11/2001 | DeLorme et al. | |
| 6,385,622 B2 | 5/2002 | Bouve et al. | |
| 6,405,129 B1 | 6/2002 | Yokota | |
| 6,408,307 B1 | 6/2002 | Semple et al. | |
| 6,415,291 B2 | 7/2002 | Bouve et al. | |
| 6,430,602 B1 | 8/2002 | Kay et al. | |
| 6,493,630 B2 | 12/2002 | Ruiz et al. | |
| 6,516,268 B2 * | 2/2003 | Ruiz et al. | 701/208 |
| 6,563,529 B1 * | 5/2003 | Jongerius | 348/36 |
| 6,772,142 B1 | 8/2004 | Kelling et al. | |
| 6,836,270 B2 | 12/2004 | Du | |
| 7,007,228 B1 * | 2/2006 | Carro | 715/210 |
| 7,092,892 B1 | 8/2006 | Sobalvarro et al. | |
| 7,133,771 B1 * | 11/2006 | Nesbitt | 701/533 |
| 7,249,160 B2 | 7/2007 | Nozaki et al. | |
| 7,321,824 B1 * | 1/2008 | Nesbitt | 701/426 |
| 7,472,019 B2 | 12/2008 | Hara | |
| 7,474,960 B1 * | 1/2009 | Nesbitt | 701/533 |
| 7,509,579 B1 * | 3/2009 | House et al. | 715/714 |
| 7,555,725 B2 * | 6/2009 | Abramson et al. | 701/208 |
| 7,818,116 B1 * | 10/2010 | Nesbitt | 701/412 |
| 2001/0029425 A1 * | 10/2001 | Myr | 701/213 |
| 2002/0067379 A1 | 6/2002 | Kenyon et al. | |
| 2002/0116336 A1 | 8/2002 | Diacakis et al. | |
| 2002/0147805 A1 * | 10/2002 | Leshem et al. | 709/223 |
| 2002/0163547 A1 * | 11/2002 | Abramson et al. | 345/855 |
| 2003/0083073 A1 | 5/2003 | Cossins et al. | |
| 2003/0093419 A1 | 5/2003 | Bangalore et al. | |
| 2003/0156124 A1 * | 8/2003 | Good et al. | 345/620 |
| 2003/0182052 A1 | 9/2003 | DeLorme et al. | |
| 2003/0191580 A1 * | 10/2003 | Endo et al. | 701/202 |
| 2004/0044469 A1 | 3/2004 | Bender et al. | |
| 2004/0054428 A1 | 3/2004 | Sheha et al. | |
| 2004/0059659 A1 | 3/2004 | Safaei et al. | |
| 2004/0073538 A1 | 4/2004 | Leishman et al. | |
| 2004/0174398 A1 * | 9/2004 | Luke et al. | 345/856 |
| 2004/0204829 A1 * | 10/2004 | Endo et al. | 701/202 |
| 2004/0257340 A1 * | 12/2004 | Jawerth | 340/995.1 |
| 2005/0027705 A1 | 2/2005 | Sadri et al. | |
| 2005/0090974 A1 * | 4/2005 | Hirose | 701/208 |
| 2005/0137791 A1 * | 6/2005 | Agrawala et al. | 701/209 |
| 2005/0187711 A1 * | 8/2005 | Agrawala et al. | 701/211 |
| 2005/0268254 A1 | 12/2005 | Abramson et al. | |
| 2005/0270311 A1 * | 12/2005 | Rasmussen et al. | 345/677 |
| 2006/0022978 A1 * | 2/2006 | Hoff | 345/427 |
| 2006/0026170 A1 | 2/2006 | Kreitler et al. | |
| 2006/0142943 A1 * | 6/2006 | Park | 701/213 |
| 2006/0271277 A1 | 11/2006 | Hu et al. | |
| 2007/0013722 A1 * | 1/2007 | Souza | 345/660 |
| 2007/0118281 A1 * | 5/2007 | Adam et al. | 701/211 |
| 2008/0102809 A1 * | 5/2008 | Beyer | 455/420 |
| 2009/0182501 A1 * | 7/2009 | Fyke et al. | 701/208 |

FOREIGN PATENT DOCUMENTS

| | | |
|---|---|---|
| JP | 2003-247850 | 5/2003 |
| JP | 2003-214869 | 7/2003 |
| JP | 2004-340827 | 2/2004 |
| JP | 2005-284340 | 10/2005 |

OTHER PUBLICATIONS

"Street Atlas USA 2003 User Guide," The Apache Software Foundation, 1999-2000, located at <http://support.radioshack.com/support_computer/doc69/69511.pdf>, pp. 1-141.

Expedia, Inc. (2003). "Expedia.com®," located at <http://www.expedia.com/pub/agent.dll?qscr=htfv&itid=&itdx=&itty=&from=f>, last visited on May 5, 2003, 6 pages.

Expedia, Inc. (2006). "Expedia.com," located at <http://www.expedia.com/Default.asp?CCheck=1&>, last visited Nov. 2, 2006, 2 pages.

GIS Development.net. (Date Unknown). "GDT and TrafficCast to Deliver Real-Time Traffic Information", located at <http://www.gisdevelopment.net/news/viewn.asp?id=GIS:N_ezpcygua . . . >, last visited on Feb. 14, 2005, 2 pages.

Hornbaek, K. (Dec. 2002). "Navigation Patterns and Usability of Zoomable User Interfaces with and without an Overview," *ACM Transactions on Computer-Human Interaction* 9(4):362-389.

Hrut, C.B. (Sep. 21-22, 1993). "Navigation Technologies: Executive Summary," *Mobile World Conference Proceedings*, 22 pages.

International Search Report and Written Opinion mailed Mar. 6, 2007, for PCT Application No. PCT/US2006/040270 filed Oct. 13, 2006, 12 pages.

TrafficCast, Inc. (Date Unknown). "The Power of Prediction™: Add Value", located at <http://www.trafficcast.com/index.html>, last visited on Feb. 14, 2005, 1 page.

TrafficCast, Inc. (Date Unknown). "The Power of Prediction™: Company Vision", located at <http://www.trafficcast.com/corporate/about.html>, last visited on Feb. 14, 2005, 1 page.

TrafficCast, Inc. (Date Unknown). "The Power of Prediction™: Data Products and Services", located at <http://www.trafficcast.com/services/service.html>, last visited on Feb. 14, 2005, 1 page.

TrafficCast, Inc. (Date Unknown). "The Power of Prediction™: Market Segments", located at <http://www.trafficcast.com/services/Marketseg.html>, last visited on Feb. 14, 2005, 1 page.

TrafficCast, Inc. (Date Unknown). "The Power of Prediction™: Markets with Real Time Traffic Data", located at <http://www.trafficcast.com/slides/TrafficCastTTAMarket.html>, last visited on Feb. 14, 2005, 3 pages.

TrafficCast, Inc. (Date Unknown). "The Power of Prediction™: Partnerships and Customers", located at <http://www.trafficcast.com/Customers/index.html>, last visited on Feb. 14, 2005, 4 pages.

TrafficCast, Inc. (Date Unknown). "The Power of Prediction™: Personalized Travel-Time Reports", located at <http://www.trafficcast.com/demonstrations/reports/text/alerts.html>, last visited on Feb. 14, 2005, 1 page.

TrafficCast, Inc. (Date Unknown). "The Power of Prediction™: Products and Services", located at <http://www.trafficcast.com/services/index.html>, last visited on Feb. 14, 2005, 1 page.

TrafficCast, Inc. (Date Unknown). "The Power of Prediction™: Time-Dependent Routing", located at <http://www.trafficcast.com/demonstrations/routing/time_dependant/pre_trip_planning.html>, last visited on Feb. 14, 2005, 2 pages.

TrafficCast, Inc. (Date Unknown). "The Power of Prediction™: TrafficCast Demonstrations", located at <http://www.trafficcast.com/demonstrations/index.html>, last visited on Feb. 14, 2005, 1 page.

TrafficCast, Inc. (Date Unknown). "The Power of Prediction™: TrafficCast Value Proposition", located at <http://www.trafficcast.com/services/valueprop.html>, last visited on Feb. 14, 2005, 1 page.

TrafficCast, Inc. (Date Unknown). "The Power of Prediction™: TrafficCast Speed Map", located at <http://www.trafficcast.com/demonstrations/maps/smartmap.html>, last visited on Feb. 14, 2005, 1 page.

(56) References Cited

OTHER PUBLICATIONS

Cederoth, R.A. et al. "Expedia, Inc.'s Third Supplemental Objections and Responses to Civix's First Set of Interrogatories." *Civix-DDI, LLC v. Cellco Partnership d/b/a Verizon Wireless, Expedia Inc., Travelscape, Inc. and Verizon Information Services, Inc.*, United States District Court for the Northern District of Illinois, Eastern Division, Case No. 03-C-3972, Aug. 19, 2004; 12 pages.

Cederoth, R.A. et al. "Travelscape, Inc.'s Sixth Supplemental Objections and Responses to Civix's First Set of Interrogatories." *Civix-DDI, LLC v. Expedia Inc., Travelscape Inc. and Verizon Information Services, Inc.*, United States District Court for the Northern District of Illinois, Eastern Division, Case No. 03-C-3972, Feb. 28, 2005; 28 pages.

Chefitz, J. et al. "Verizon Information Service's Second Supplemental Objections and Response to Civix's Interrogatory No. 3,"*Civix-DDI, LLC v. Expedia, Inc., Travelscape Inc., and Verizon Information Services, Inc.*, United States District Court for the Northern District of Illinois, Eastern Division, Case No. 03-C-3972; 7 pages.

\* cited by examiner

Figure 8c http://alpha.maps.yahoo.com/int/#maxp=search&q1=701%2520Av e%252E%252C%2520Sunnyvale%252C%2520CA%252C%252094089&trf=0 &lon=-122.02486753463 7&lat=37.4163909553923&mag=3

METHOD AND SYSTEM FOR NAVIGATING A MAP

CROSS-REFERENCE TO RELATED APPLICATIONS

This application claims the benefit of application No. 60/727,206, "Interactive Mapping Method and System," filed Oct. 14, 2005, which is incorporated herein in its entirety by reference.

FIELD OF THE INVENTION

The present invention relates to the field of computer-network-based mapping. In particular, the present invention relates to a method and system for navigating a map.

BACKGROUND OF THE INVENTION

With the increasing popularity of the Internet, millions of users use the Internet to get maps of address locations of interest to them or to get driving directions for getting to such address locations. With conventional map applications, a user would enter a start address and an end address in order to get a driving direction. The conventional map applications would return a map and a list of driving directions from the start address to the end address.

One drawback of the conventional map applications is that it is cumbersome to navigate the map. Typically, the conventional map applications allow users to zoom in or zoom out for different levels of views of the map. It also allows users to move the whole map in north, south, east, or west direction using the corresponding arrow button. However, to get sufficient details from one location (point A) to another location (point B), the user may have to maneuver the navigational buttons, such as zoom-in, zoom-out, north, south, east, and west, many times to get sufficient details from the map to follow the route from point A to point B.

Therefore, there is a need for a method and system for navigating a map to address the drawbacks of the conventional map applications.

SUMMARY

The present invention generally relates to a method and system for navigating a map. In one embodiment, a method for navigating a map in a browser window of a user device via the Internet includes providing a first map for showing geographic context of a general area, providing a second map for showing geographic context of a portion of the general area, superimposing the second map onto the first map, wherein the second map is represented by a highlighted area in the first map, and navigating the first map using the highlighted area. The method further includes displaying points of interest inside the highlighted area of the first map and in the second map for assisting a user in navigating to the points of interest, and displaying additional points of interest outside the shaded area of the first map for assisting a user in navigating to the additional points of interest.

BRIEF DESCRIPTION OF THE DRAWINGS

The aforementioned features and advantages of the invention as well as additional features and advantages thereof will be more clearly understandable after reading detailed descriptions of embodiments of the invention in conjunction with the following drawings. The patent or application file contains other than black and white line drawings. Copies of this patent or patent application publication with the other than black and white line drawings will be provided by the Office upon request and payment of the necessary fee.

FIGS. 8a-8c illustrate an address-to-business lookup method according to embodiments of the present invention.

DESCRIPTION OF EMBODIMENTS

The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of procedures, steps, logic blocks, processing, and other symbolic representations of operations on data bits that can be performed on computer memory. A procedure, computer-executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

In various embodiments, the method and system for navigating a map of the present invention implement Web 2.0 functionalities using a combination of HTML, CSS, JavaScript, Asynchronous JavaScript and XML (AJAX), Y!Q, Yahoo! Maps, Yahoo! Widget Engine, and Yahoo! Toolbar for Internet Explorer.

Figure 1A:
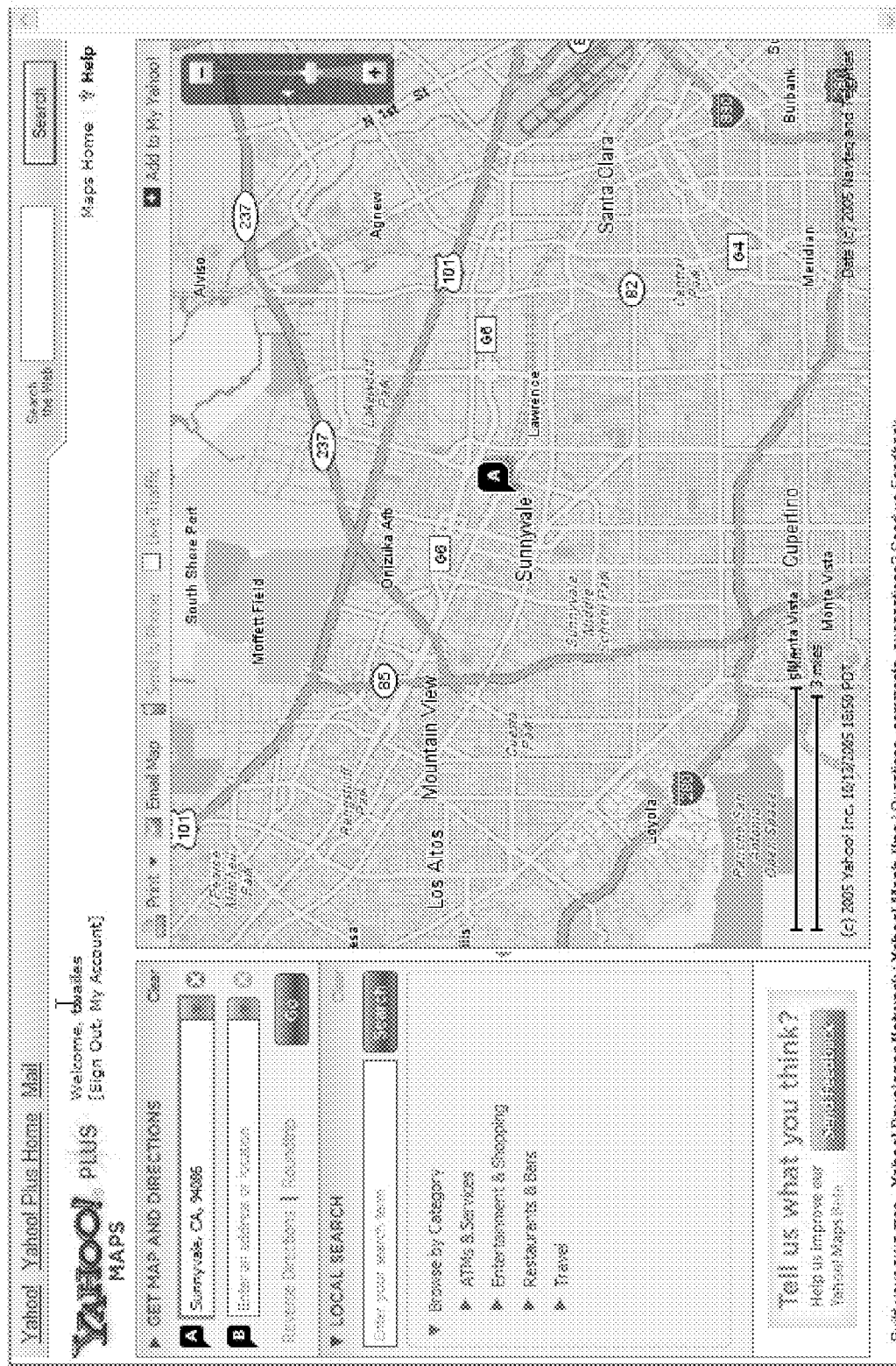
FIGS. 1a-1d illustrate a multipoint routing method according to embodiments of the present invention.
Figure 1B:
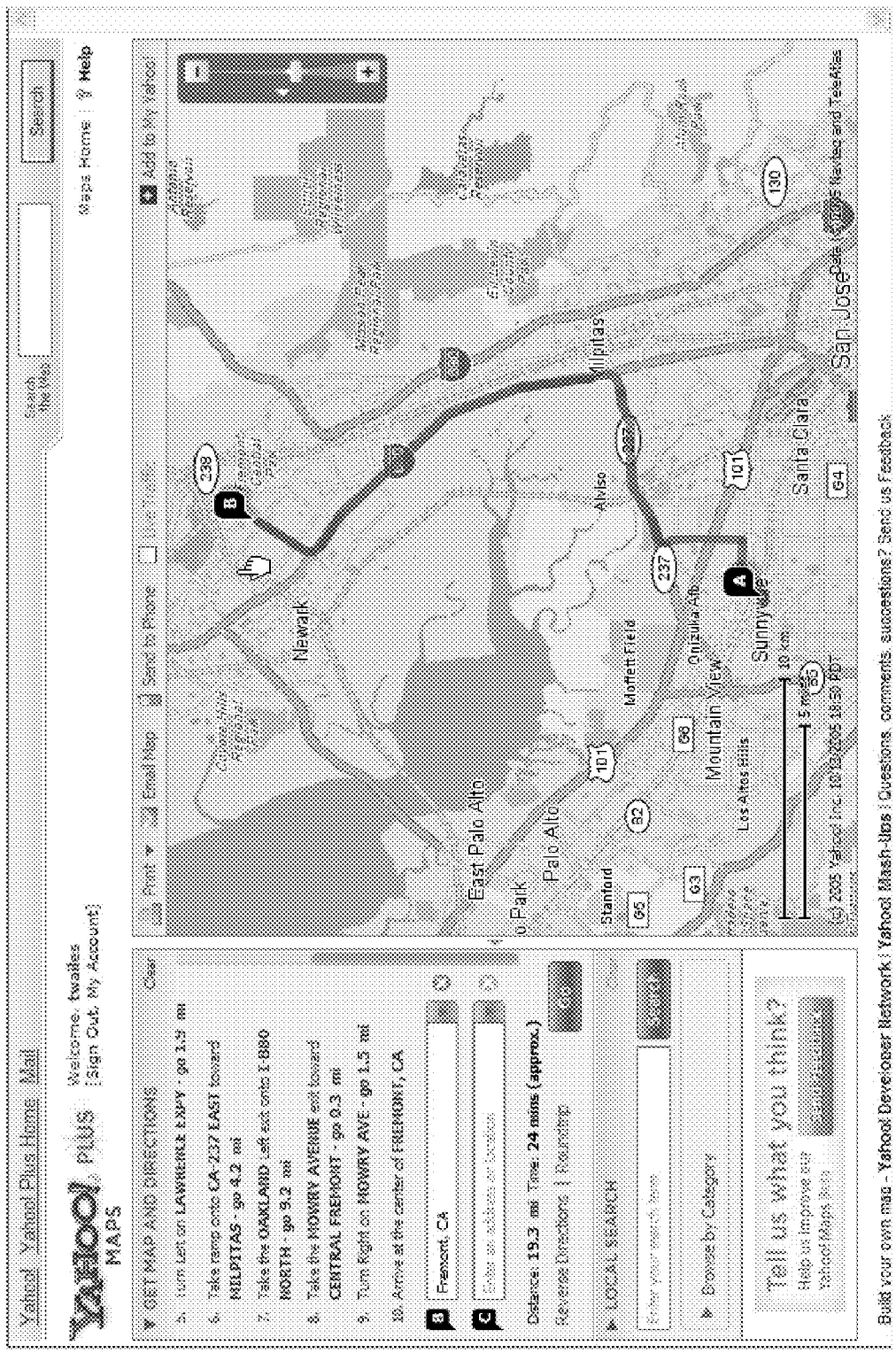
Figure 1C:
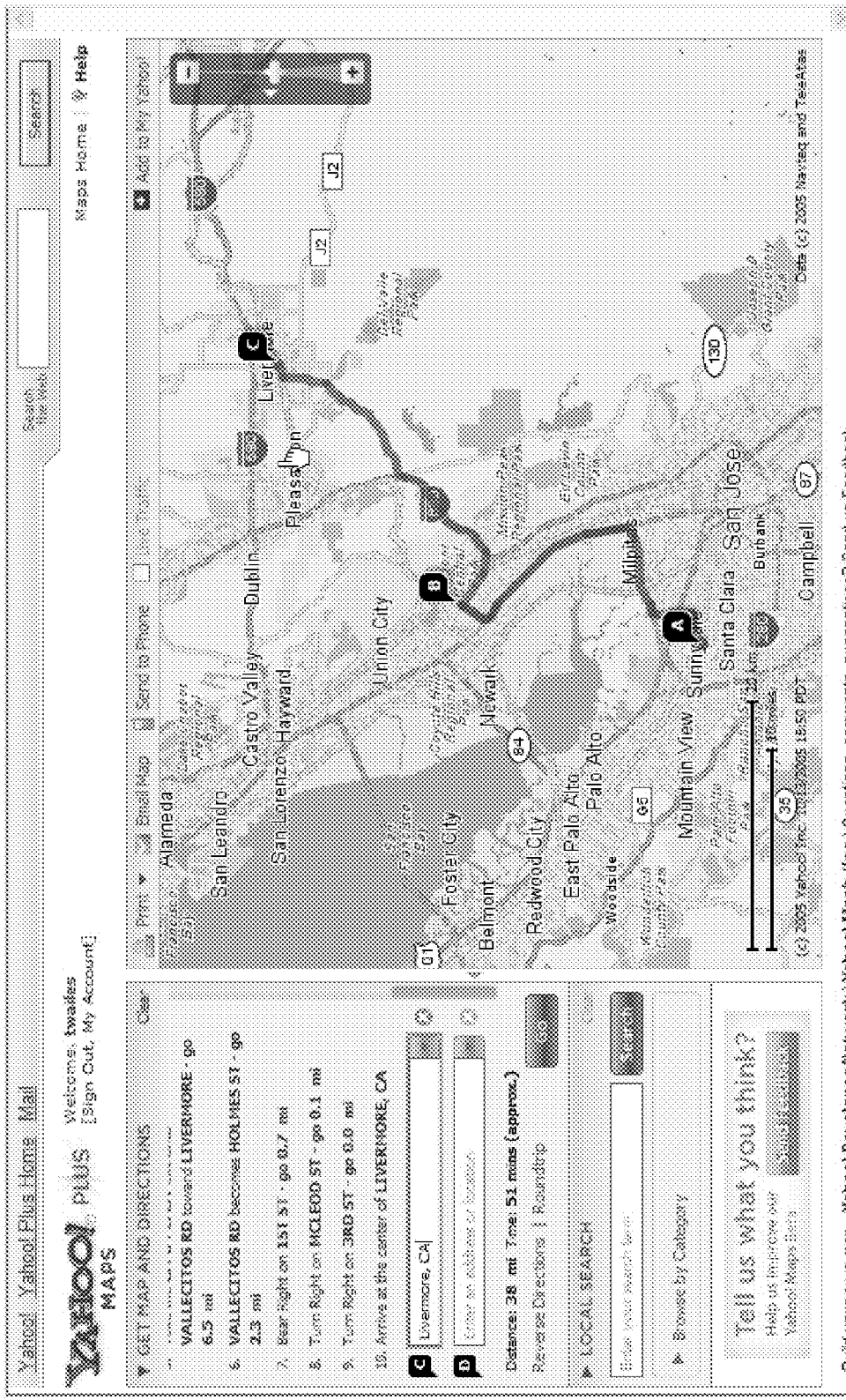
Figure 1D:
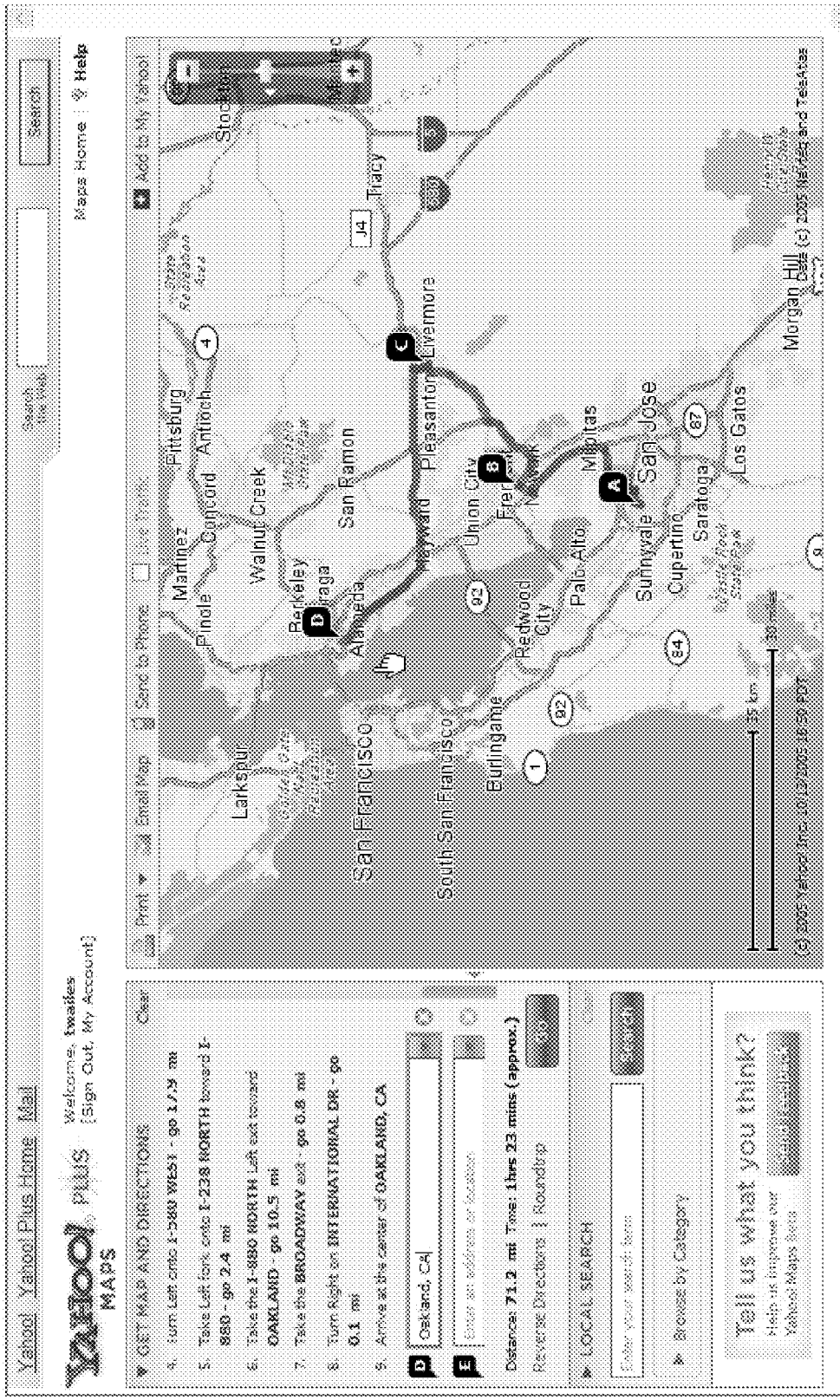

FIGS. 1a-1d illustrate a multipoint routing method according to embodiments of the present invention. FIG. 1a shows a user entering a first location at the location entry box A. FIG. 1b shows the user entering a second location at the location entry box B. Similarly, FIGS. 1c and 1d show the third and fourth locations are entered at locations entry boxes C and D respectively. Note that upon entering the second location at the location entry box B, the method automatically provides the next location entry box C for the user to enter additional locations, if any. This process is repeated for the subsequent entries, for example the fourth and fifth locations at location entry boxes D and E respectively.

As shown in FIGS. 1a-1d, the interactive mapping system affords a user the ability to create routes with multiple way-points. The user not only is able to create a route from one address/location (A) to another address/location (B), but also may have the option to continue his route to other addresses/locations, such as addresses/locations C, D, and beyond. The route steps between two way-points (e.g., A and B) are described in U.S. application Ser. No. 10/849,083, filed May 19, 2004, entitled "Mapping Method and System," and its continuation-in-part U.S. application Ser. No. 11/137, 603, filed May 25, 2005, entitled "Mapping Method and System," both of which are incorporated herein by reference in their entirety.

Figure 2A:
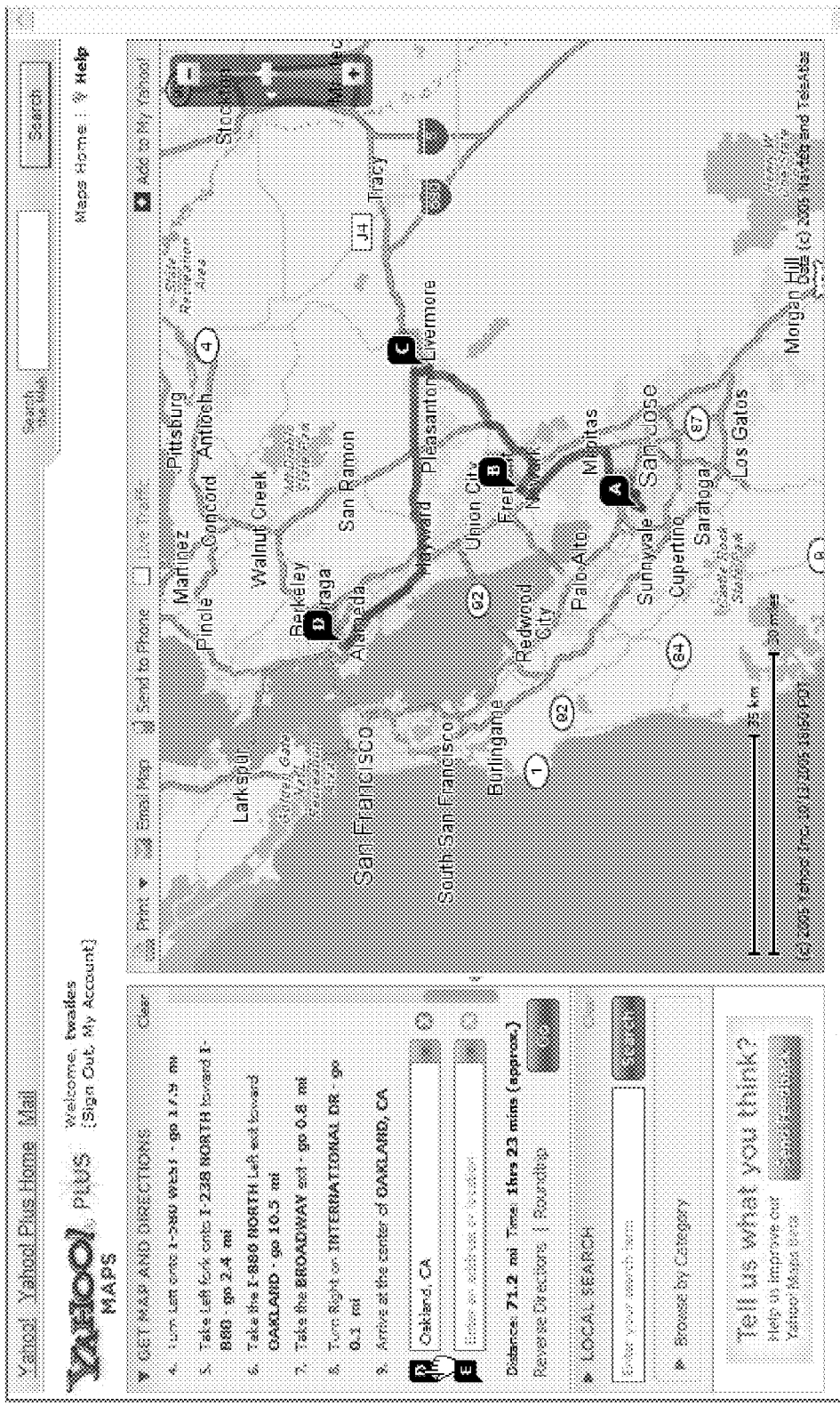
FIGS. 2a-2c illustrate re-ordering of destinations in the multipoint routing method according to embodiments of the present invention.
Figure 2B:
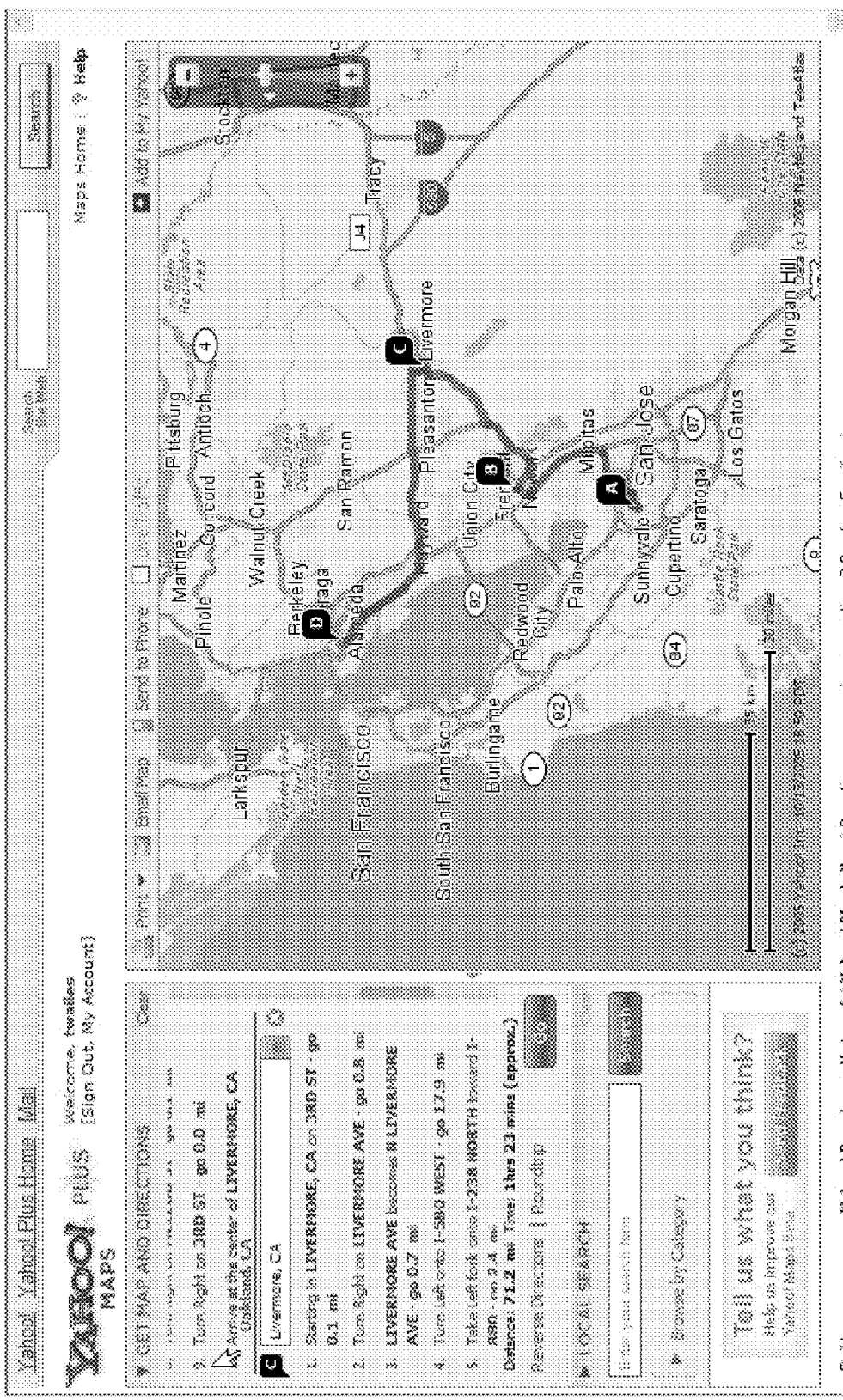
Figure 2C:
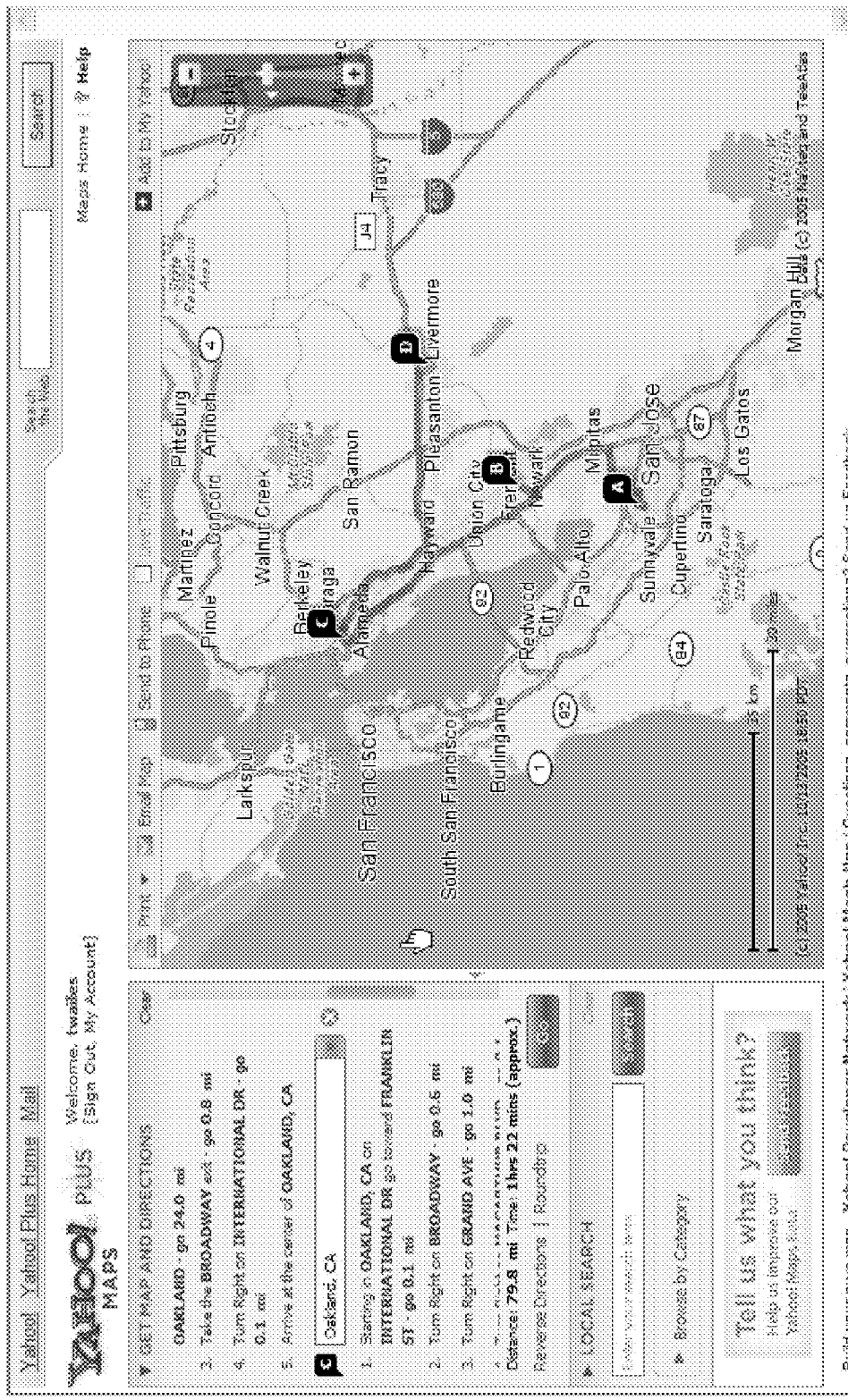

FIGS. 2a-2c illustrate re-ordering of destinations in the multipoint routing method according to embodiments of the present invention. FIG. 2a shows the user (cursor shown as a hand) grabbing the D point to be moved to in front of the C point (Livermore) in the route. FIG. 2b shows the D point (Oakland) being dragged and inserted prior to the C point (Livermore). FIG. 2c shows the new C point (Oakland) both in the map and directions list and in the route drawn on the map. The previous C point (Livermore) becomes the new D point.

As shown in FIGS. 2a-2c, the user may re-order way-points within his route by dragging and dropping within the list view of the route or by dragging a way-point from the map view into the desired point in the list view. For example, the user may decide to change way-point D to be the first stop, so he can drag that point and drop it before the current B way-point in the route list view, and it becomes the new B way-point. The previous B way-point is displaced and becomes the new C way-point and so on. The route steps description and representation on the map are refreshed to describe and show the new route.

Figure 3A:
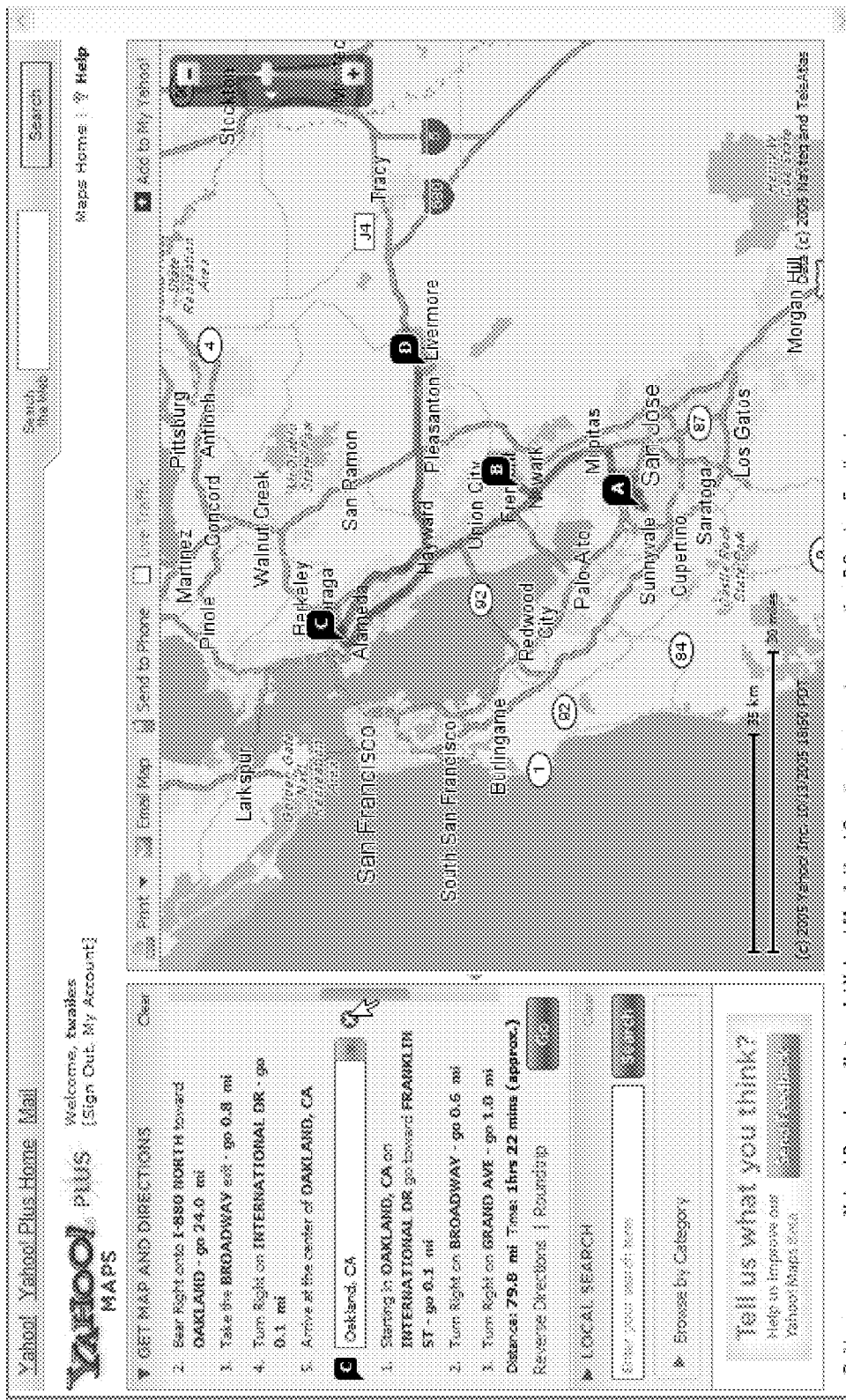
FIGS. 3a-3b illustrate removing a destination in the multipoint routing method according to embodiments of the present invention.
Figure 3B:
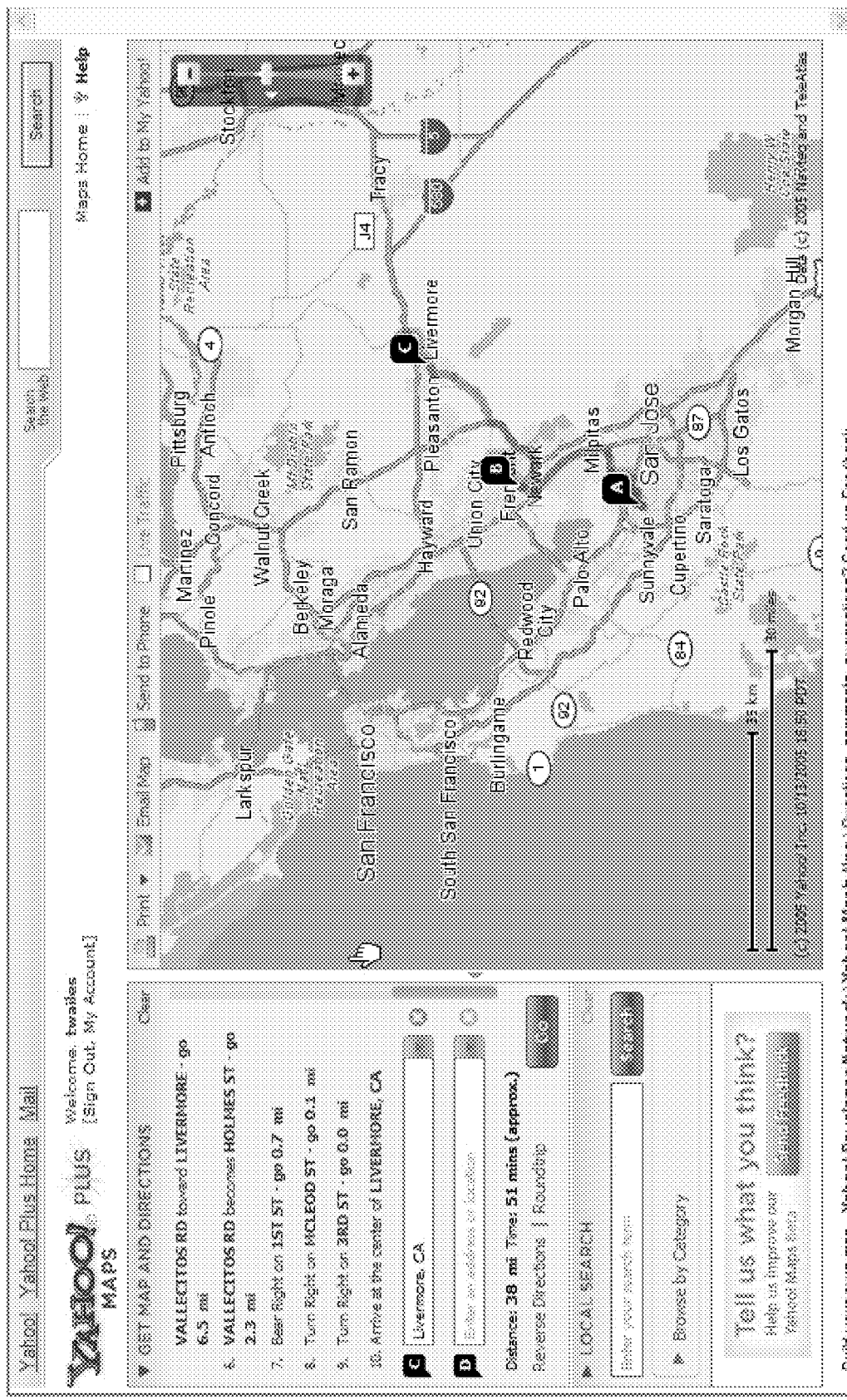

FIGS. 3a-3b illustrate removing of a destination in the multipoint routing method according to embodiments of the present invention.

FIGS. 3a-3b show the user may delete one or more way-points from his route. For example, the user may remove way-point B from a route that has way-points A-B-C-D. After way-point B is removed, way-point C becomes the new B way-point, and D becomes the new C way-point. In FIG. 3a, the delete icon at the right-side of way-point C is selected. After the way-point C (Oakland) is deleted, the original way-point D (Livermore) becomes the new way-point C as shown in FIG. 3b.

Figure 4A:
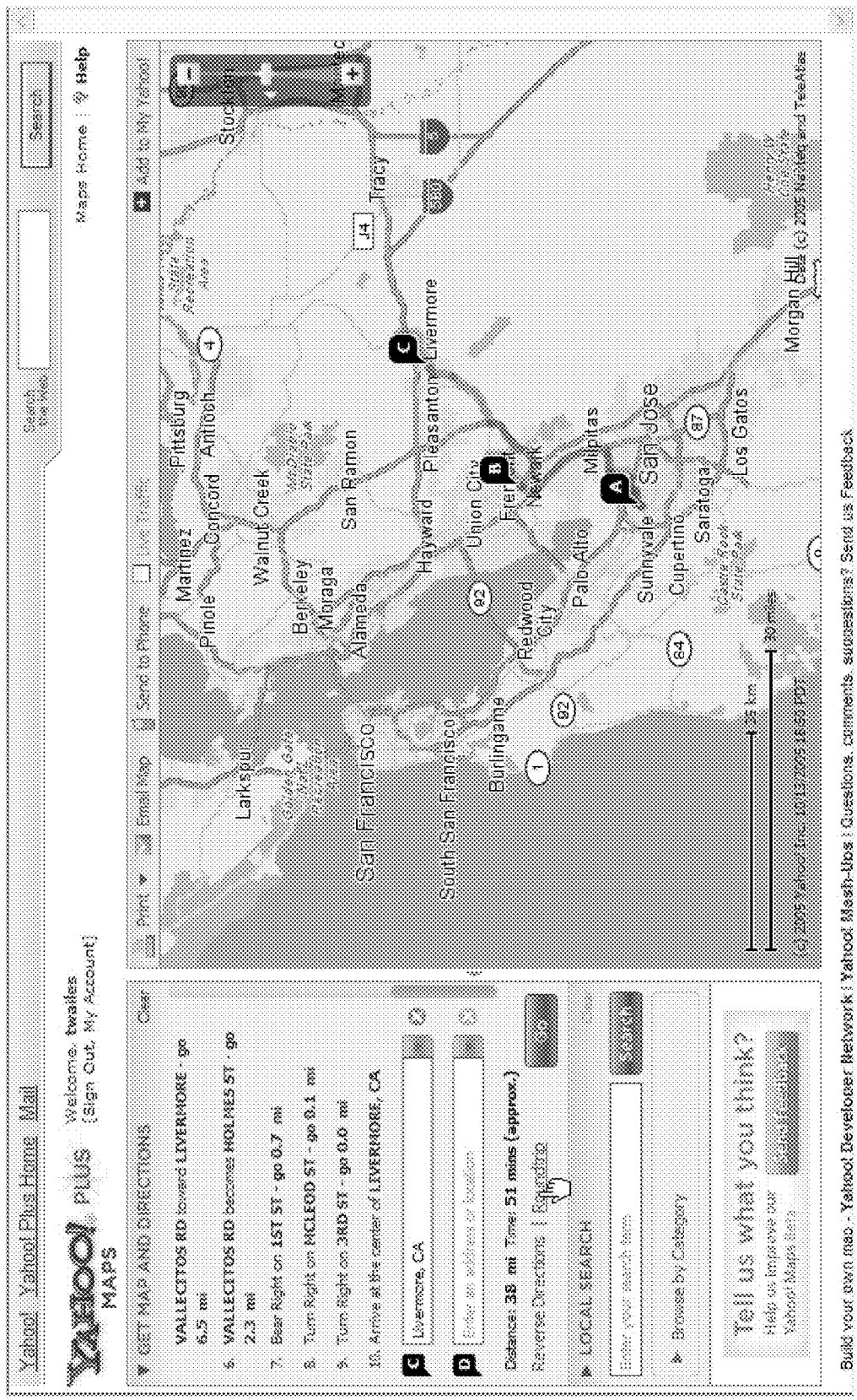
FIGS. 4a-4b illustrate creating a roundtrip in the multipoint routing method according to embodiments of the present invention.
Figure 4B:
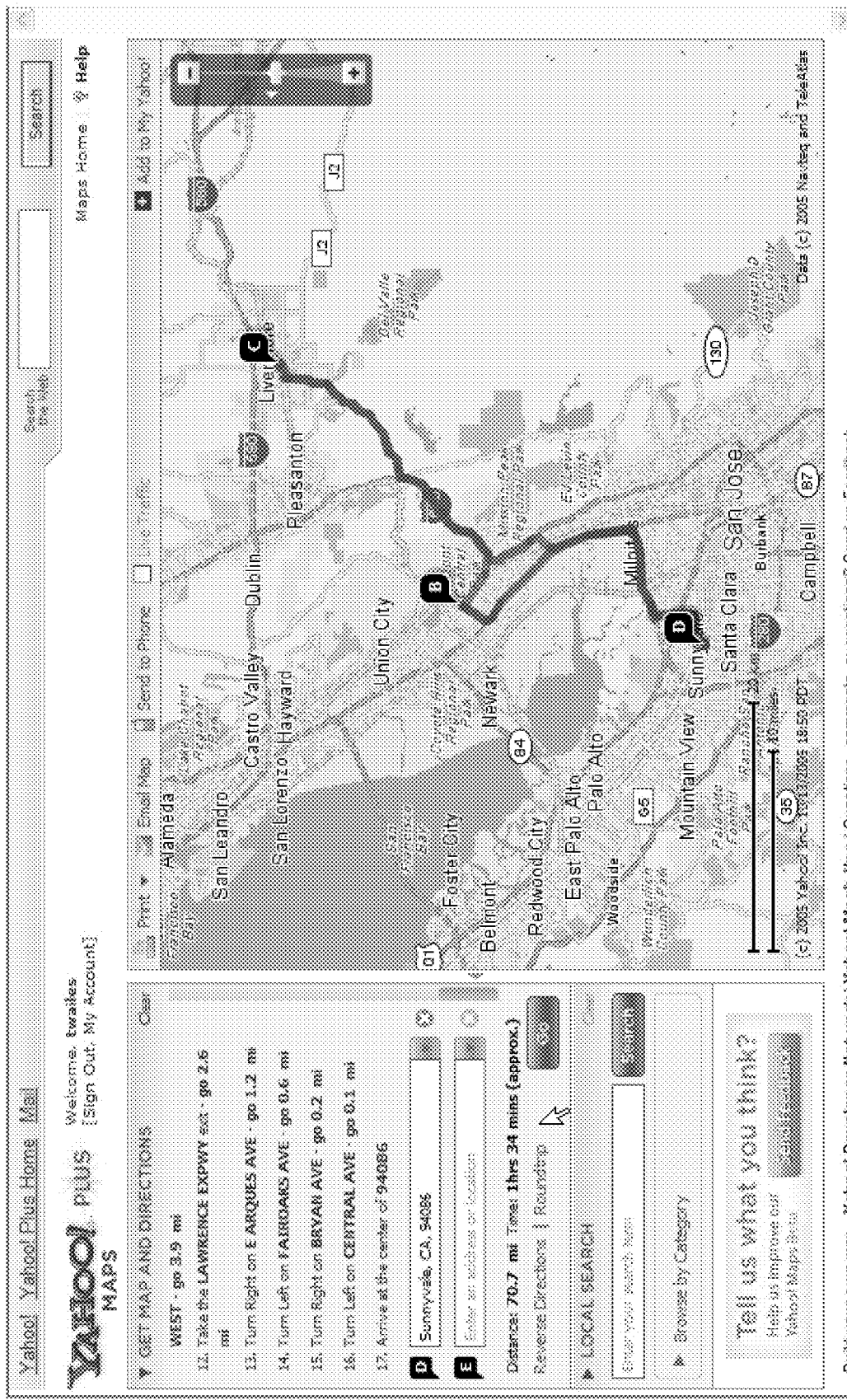

FIGS. 4a-4b illustrate creating a roundtrip in the multipoint routing method according to embodiments of the present invention. This is done by selecting the Roundtrip link as indicated by the cursor (hand) in FIG. 4a. The user may create a multipoint route by drag and drop of local entities (e.g., businesses) represented on the map from the map to the desired position within the route list view. FIG. 4b shows the complete roundtrip both on the map and on the directions list. As a result, the total distance of the trip is increased to 70.7 miles (the sum of the distance of each of the two routes), and the amount of time is increased to one hour and thirty four minutes (the sum of the time of each of the two routes).

Figure 5A:
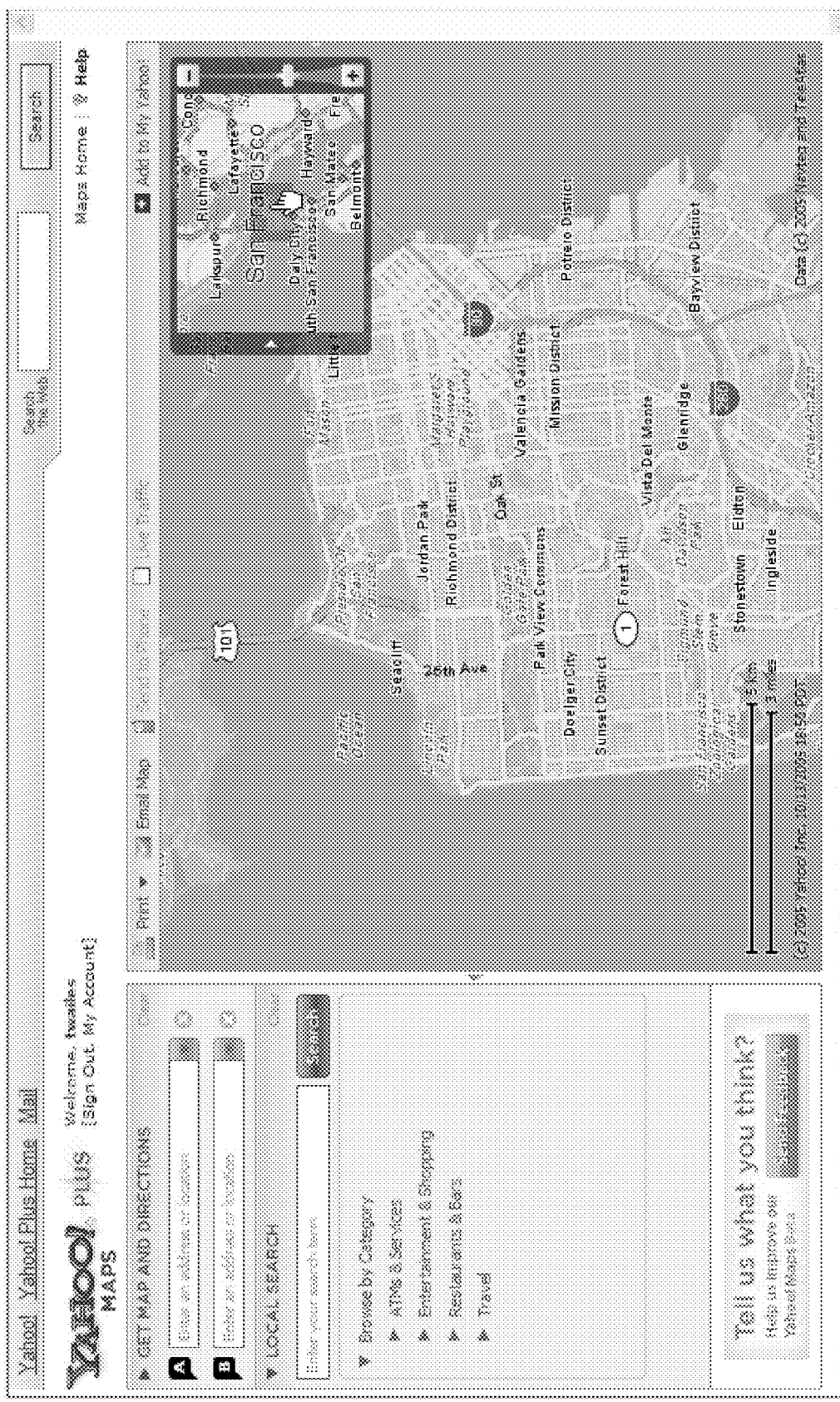
FIGS. 5a-5e illustrate a map navigator according to embodiments of the present invention.

FIGS. 5a-5e illustrate a map navigator according to embodiments of the present invention. A map navigator includes a small map that gives the surrounding geographic context of the large map view. Within the map navigator, the extent of the current large map view is represented by a shaded rectangular driving (panning) control super-imposed on the surrounding geographic context map, as shown in FIG. 5a. For example, while the large map may show the City of San Francisco, the map navigator map shows the Bay Area with a shaded rectangular area representing San Francisco.

Figure 5B:
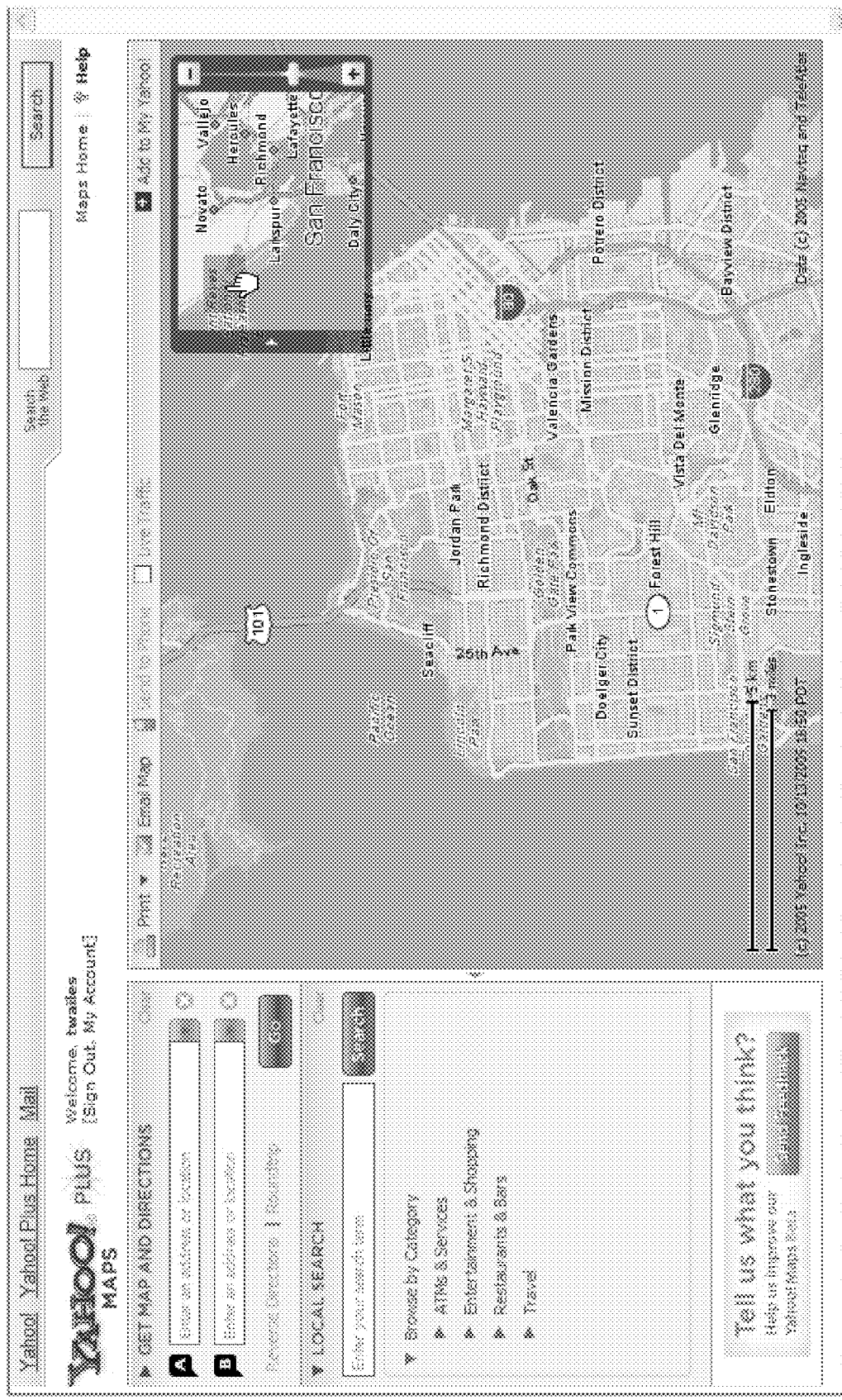
Figure 5C:
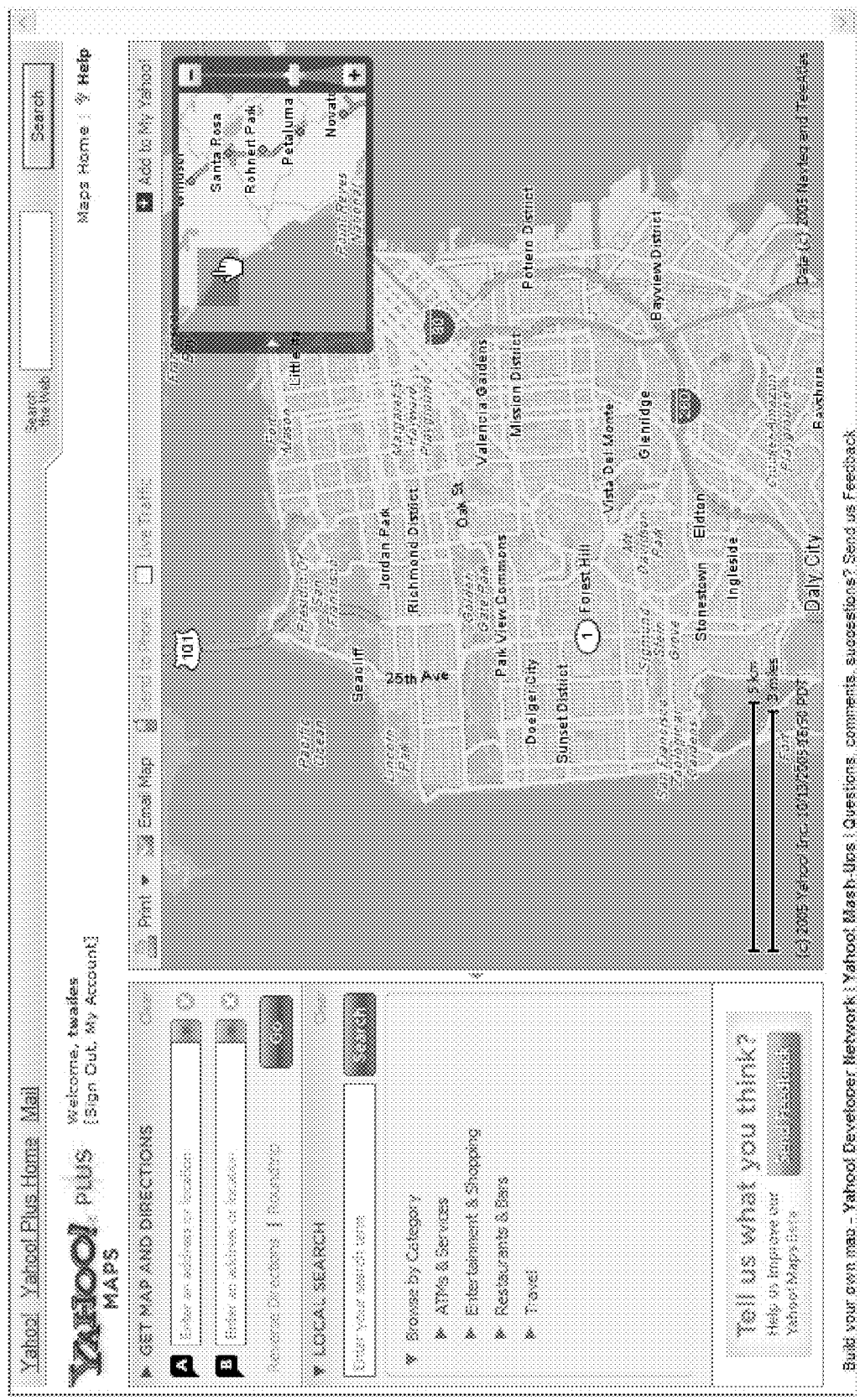
Figure 5D:
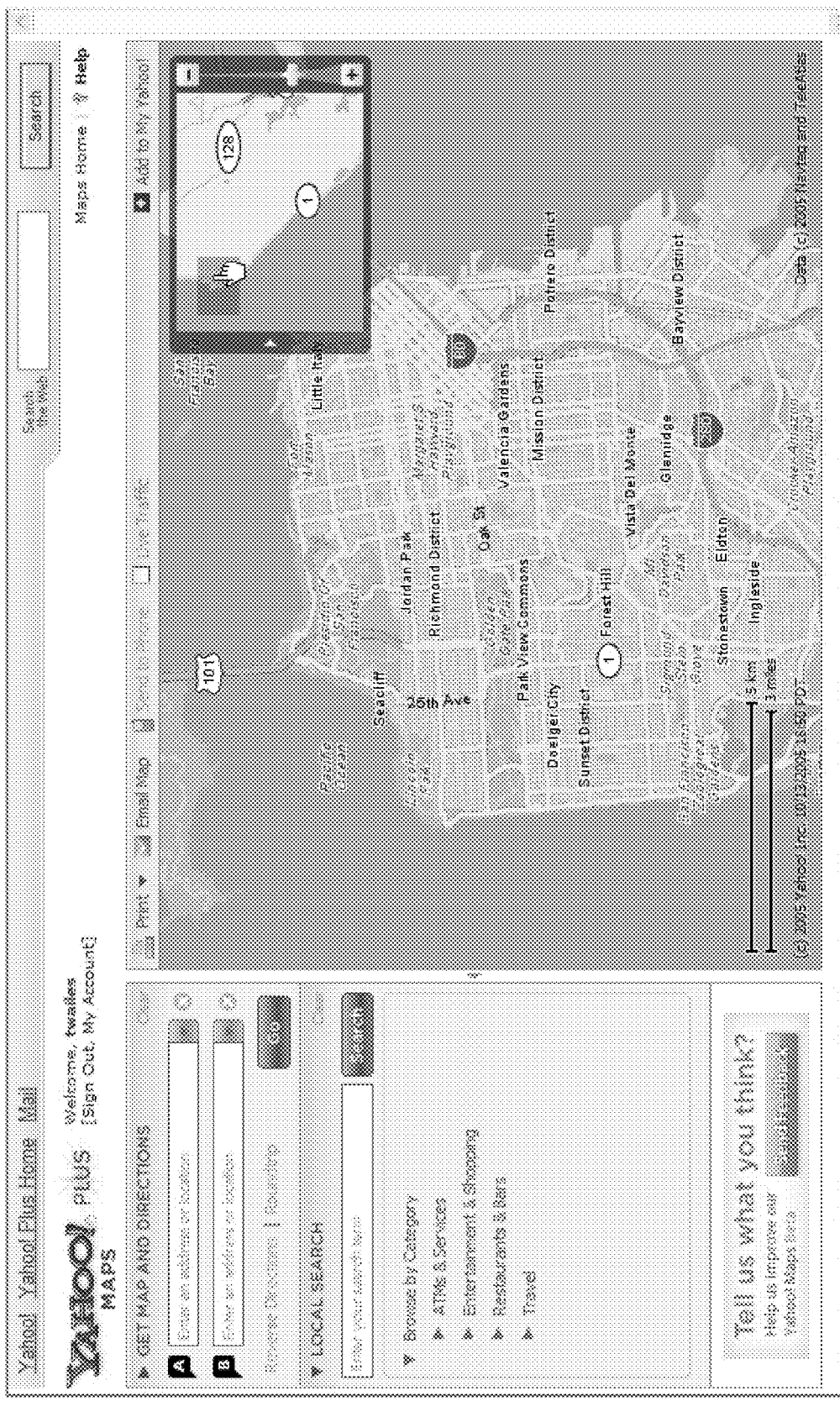
Figure 5E:
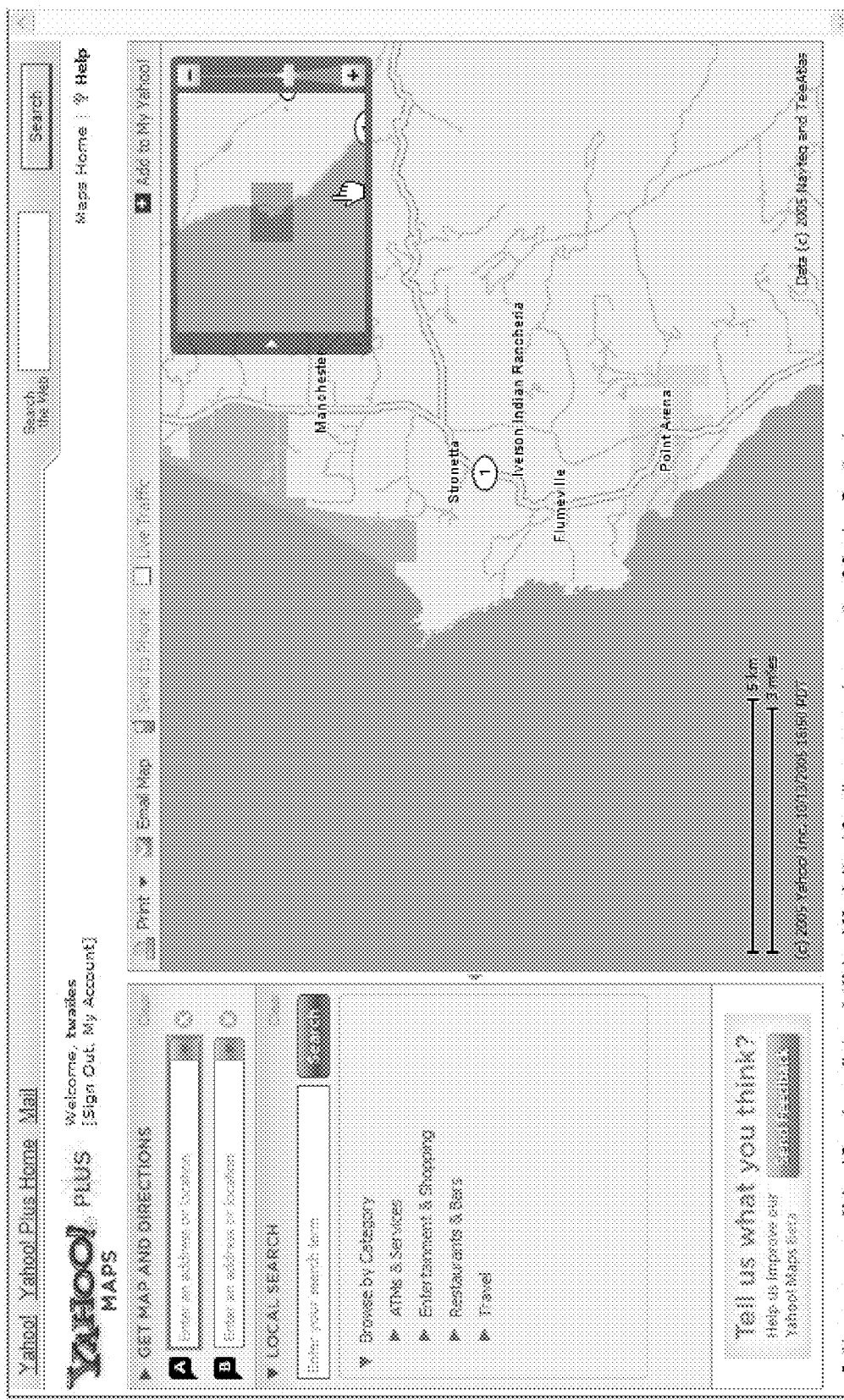

The user can use this shaded area as a control to "drive" to other locations and so explore the geographic context of the current map. As shown in FIG. 5b, this is done by dragging the driving control (shown as the cursor over the grey box) in the direction he wants to drive. In FIG. 5c, the map navigator continuously pans in the direction the user is moving the panning control for as long as the user continues to hold and drag it. In FIG. 5d, the user releases the panning control, and in FIG. 5e, the driving control then settles on the center of the map navigator area, and the large map redraws to the new location the user just drove to.

Figure 6:
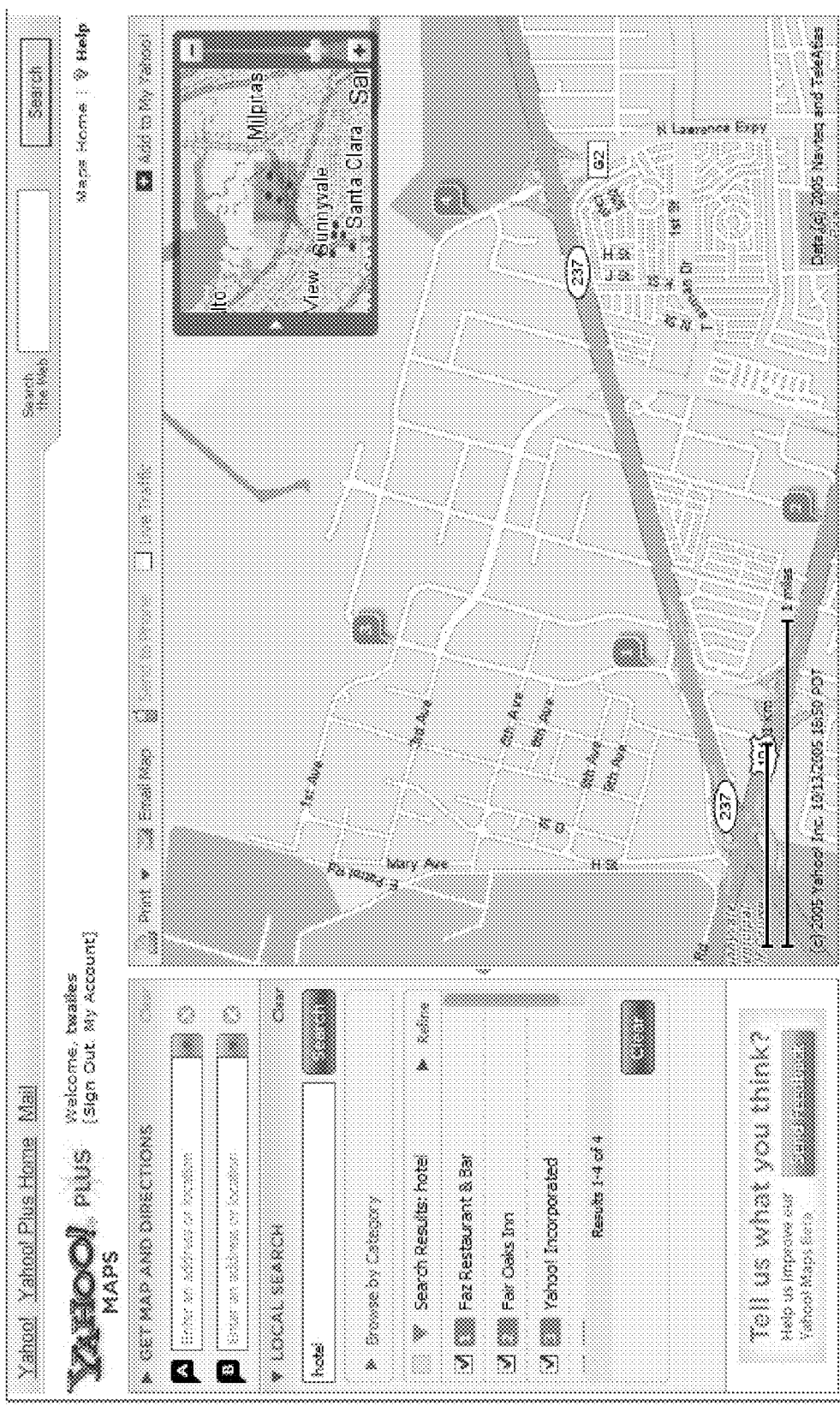
FIG. 6 illustrates result clusters associated with the map navigator according to embodiments of the present invention.

FIG. 6 illustrates result clusters associated with the map navigator according to embodiments of the present invention. The map navigator may also show representations of data points of interest, for example, businesses such as cafes, hotels, or restaurants. While the large map may only show, say, three points of interest, the map navigator is able to display representations of further similar points of interest in geographic areas adjacent to the view shown by the large map. This allows the user to quickly see and navigate to areas outside the large map view that may contain data of interest. For example, the large map only shows three hotels, but the map navigator shows a cluster of six more to the southwest. Other data of interest such as routes, traffic, demographic statistics, and any other geo-data may be similarly represented.

Figure 7A:
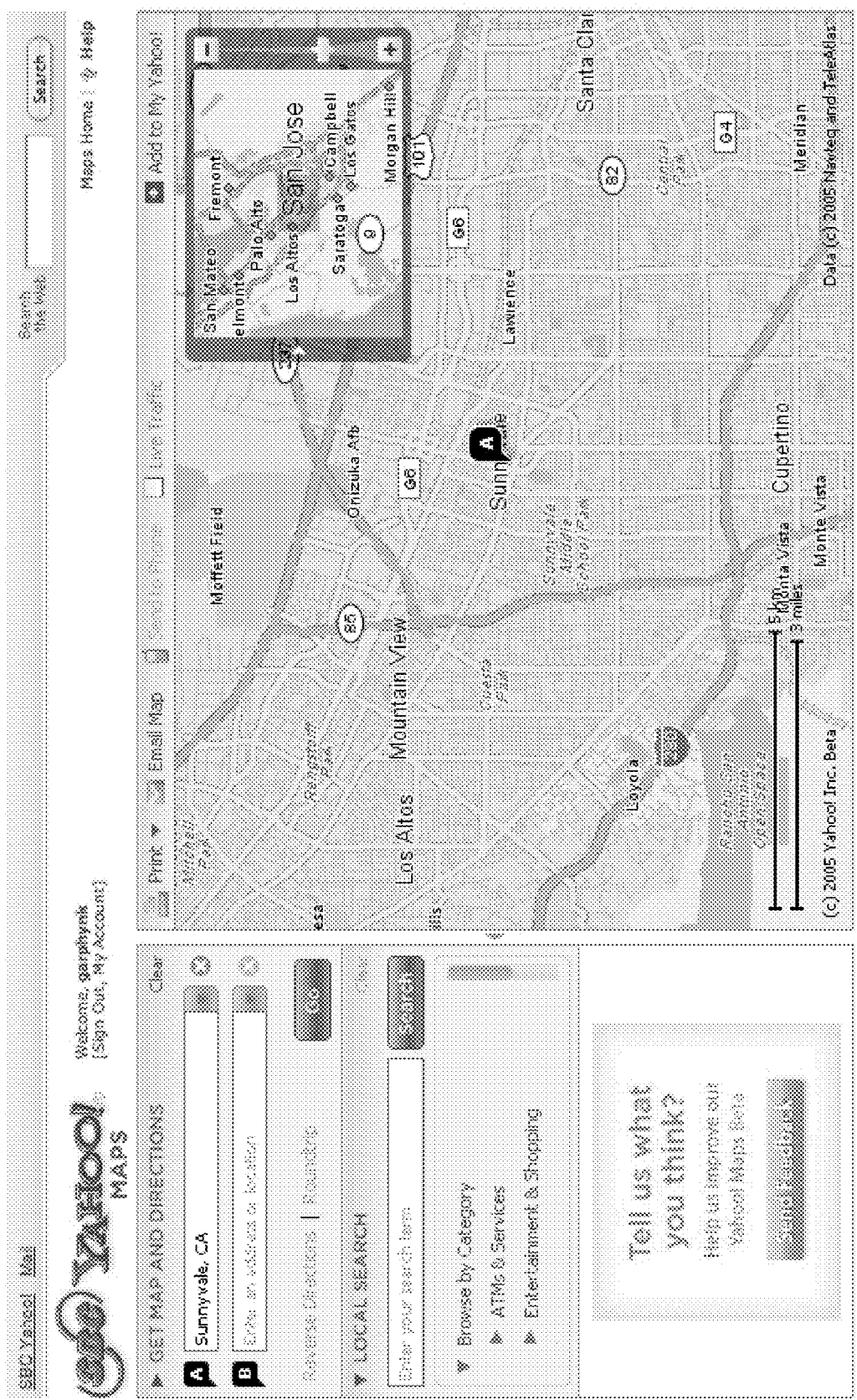
FIGS. 7a-7b illustrate aspect ratio of the map navigator according to embodiments of the present invention.
Figure 7B:
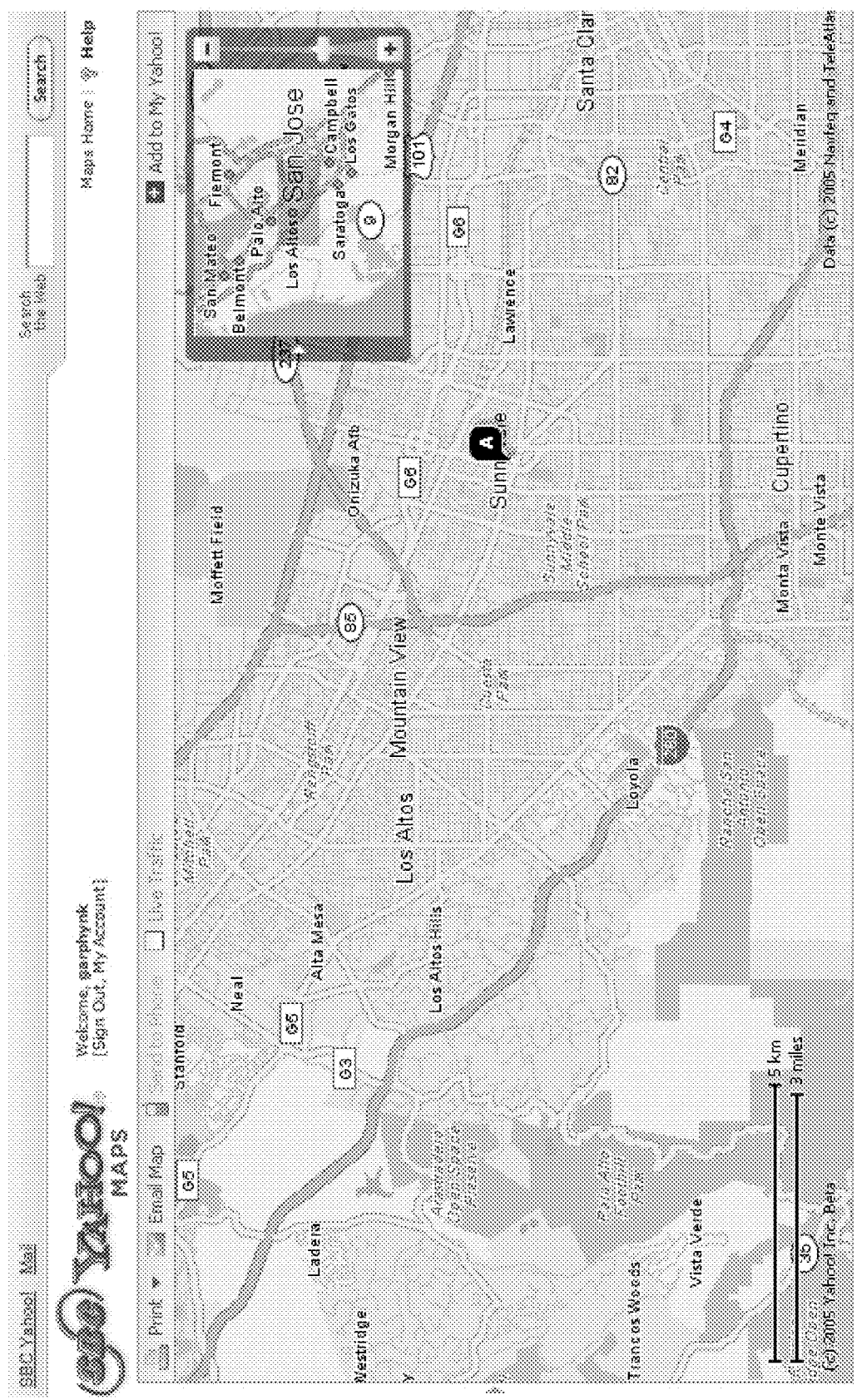

FIGS. 7a-7b illustrate aspect ratio of the map navigator according to embodiments of the present invention. FIG. 7a shows a default view of the map navigator, which has substantially the same aspect ratio as the main map. FIG. 7b shows an all-map view of the map navigator, which also has substantially the same aspect ratio as the main map. Note that the aspect ratio of the driving control corresponds to that of the large map, such that it changes due to the browser window re-sizing or the closing of the control panel.

Figure 8A:
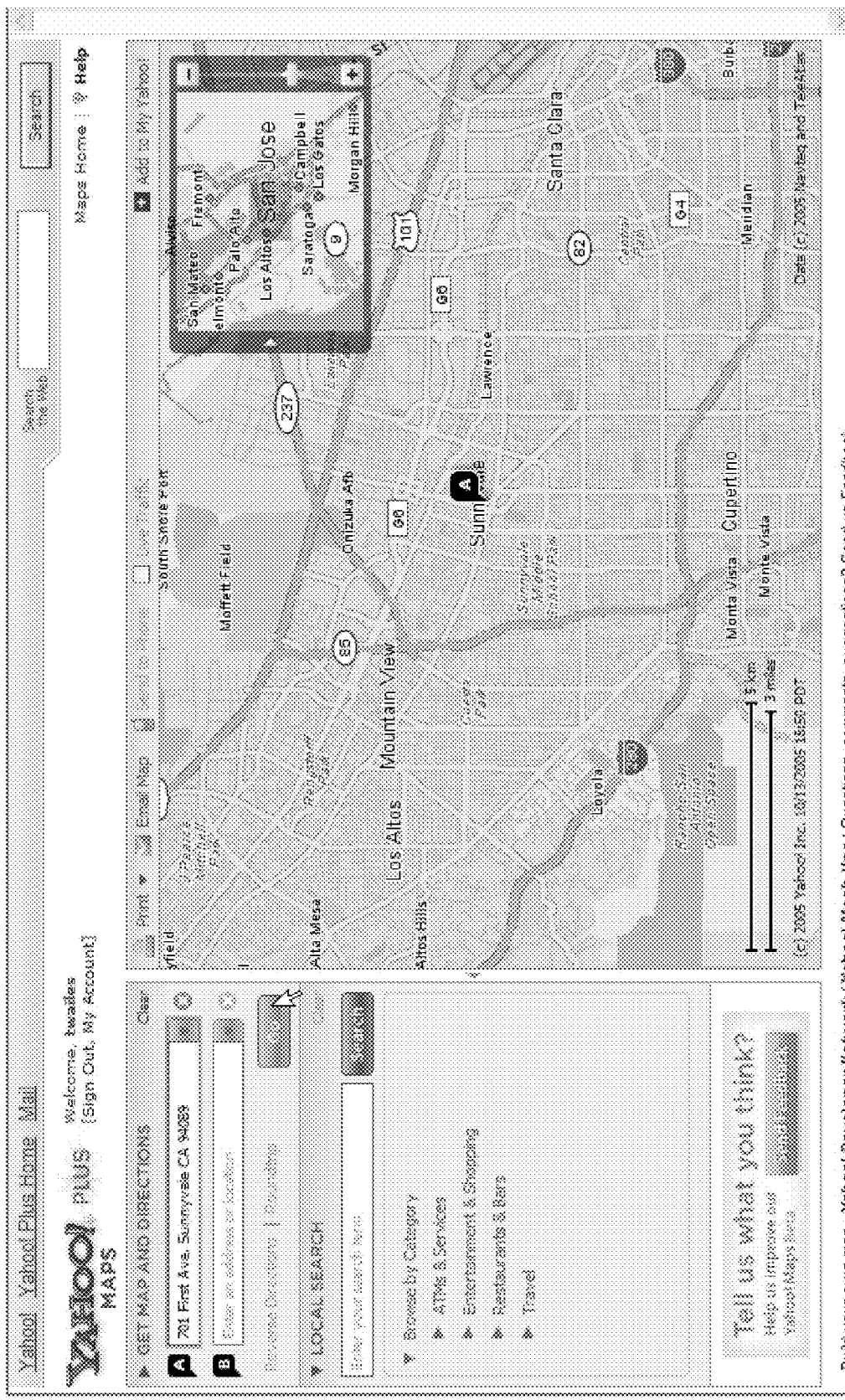
Figure 8B:
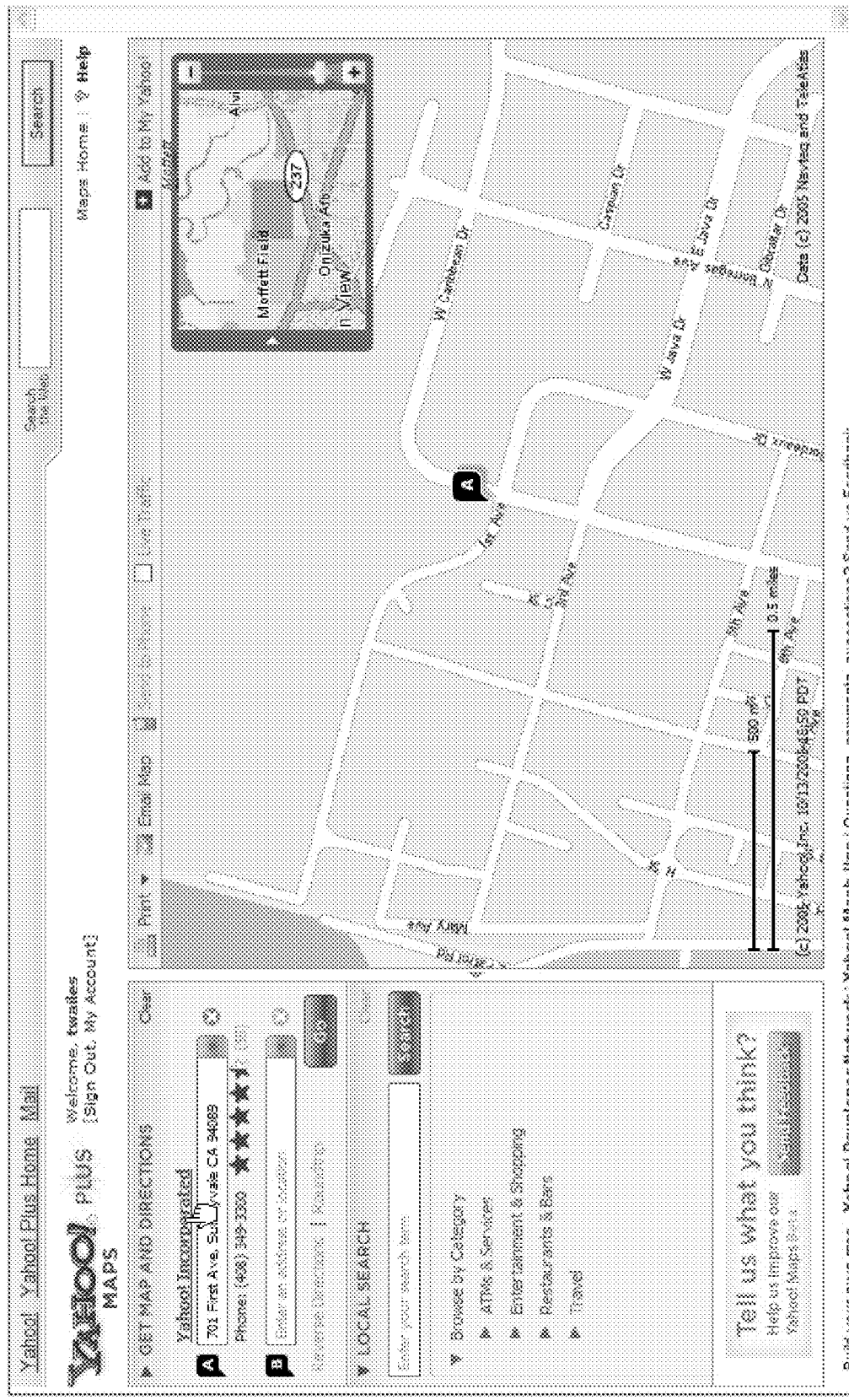

FIGS. 8a-8c illustrate an address-to-business lookup method according to embodiments of the present invention. The interactive mapping system matches an address entered into a location field with a known business. For example as shown in FIG. 8a, a user may enter "701 First Ave, Sunnyvale Calif. 94089" into location field A, and upon submission of this entry, the system returns a match for the business known to be at this address, as shown in FIG. 8b as Yahoo! Incorporated. Additional information about that business may then be displayed, such as the phone number, user ratings (stars) of the business, etc. The user may access further information about this business by linking to supplementary pages shown in FIG. 8c, which may include user reviews, photos, hours of operation, and other relevant information.

Figure 9A:
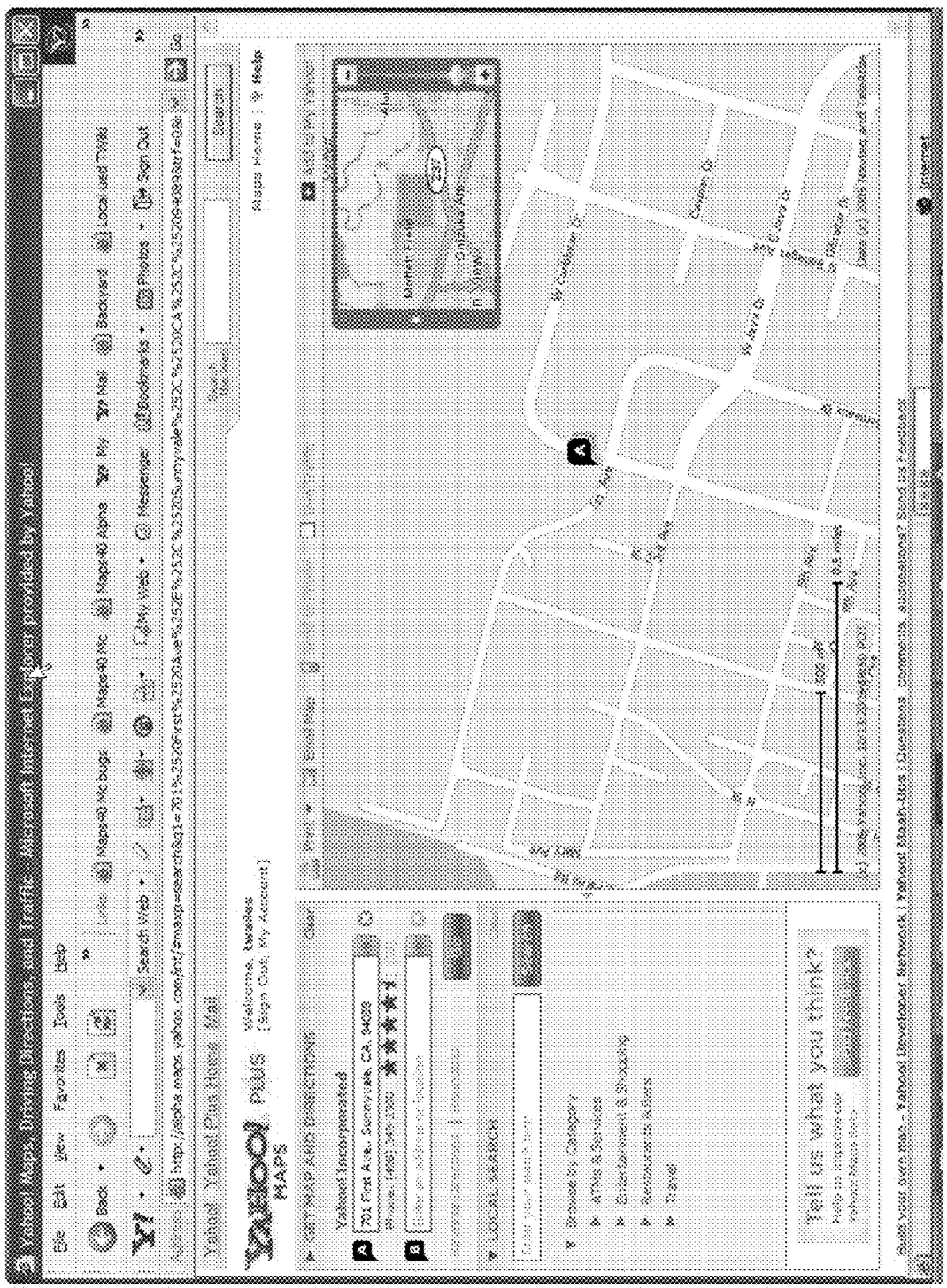
FIGS. 9a-9c illustrate a method for updating an address in the uniform resource locator (URL) according to embodiments of the present invention.
Figure 9B:
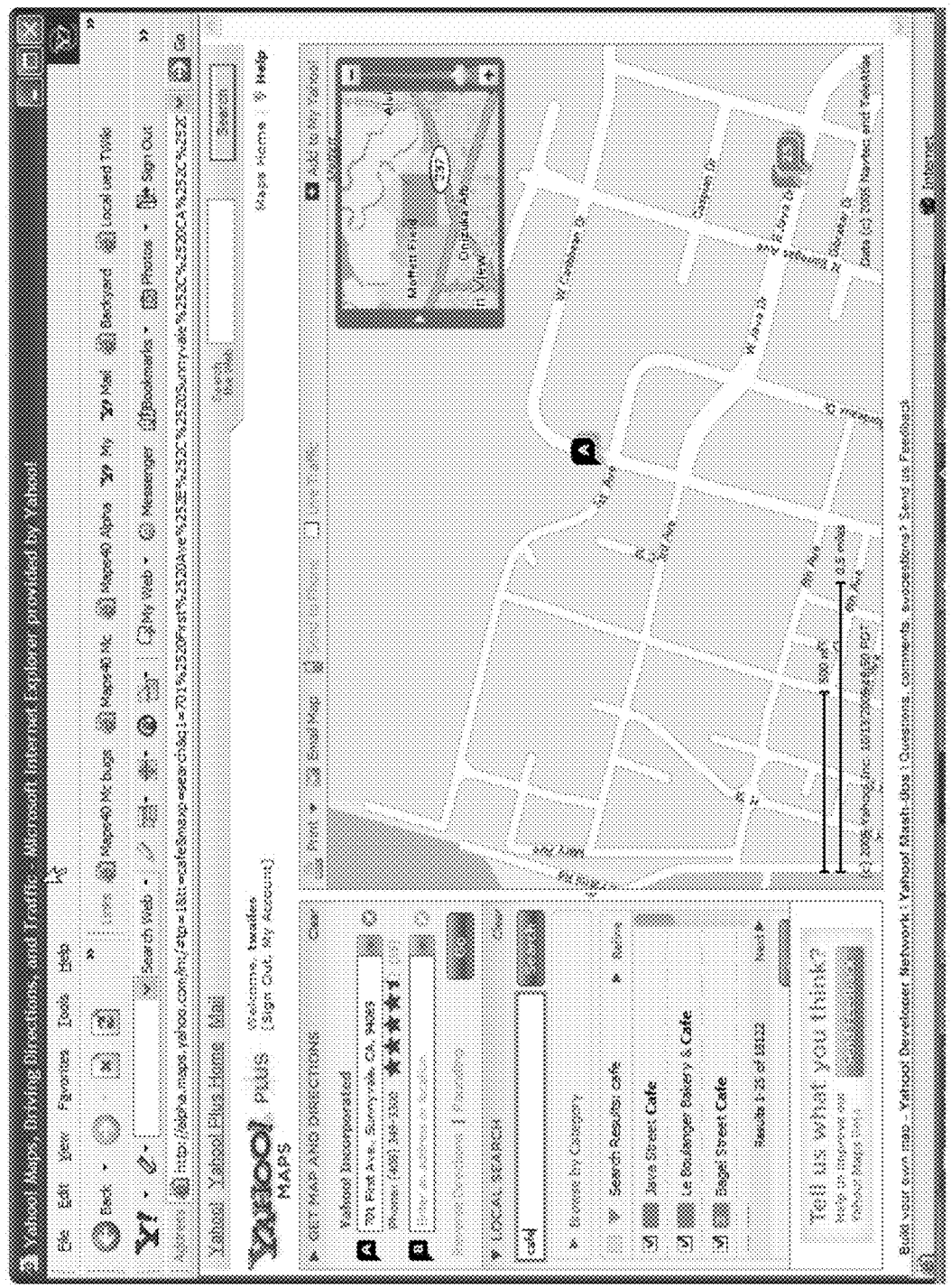
Figure 9C:
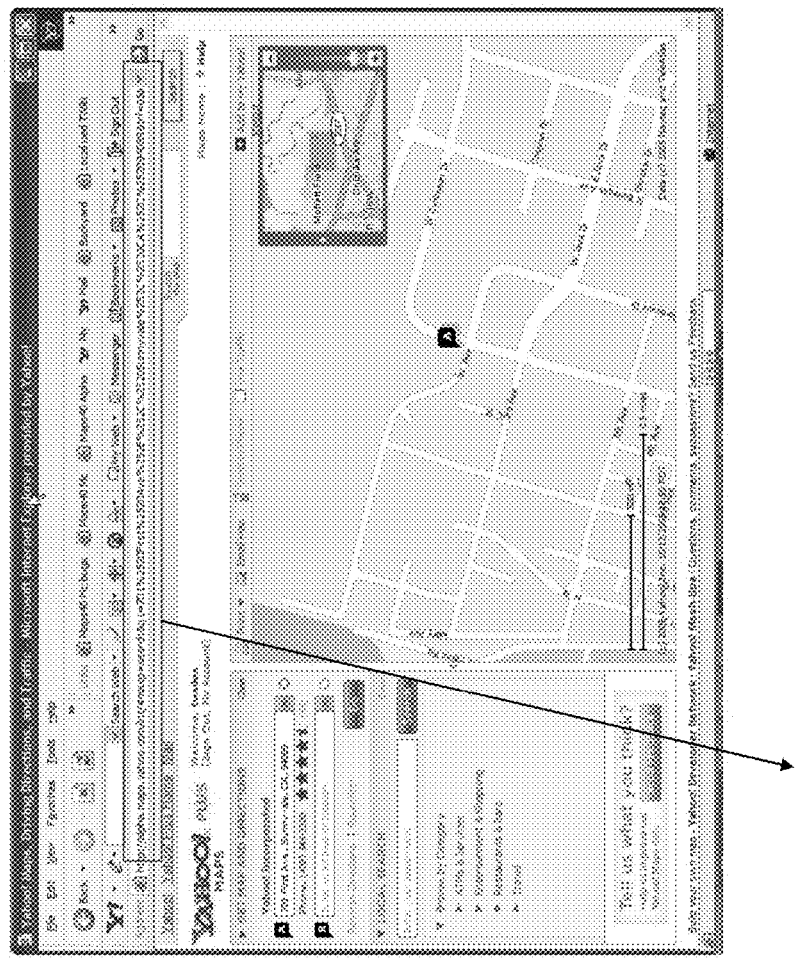

FIGS. 9a-9c illustrate a method for updating an address in the URL according to embodiments of the present invention. The interactive mapping system automatically updates the URL in the browser address bar in real time. This URL contains sufficient information to allow for the redrawing of the current map view, including any data superimposed on it, such as driving directions, points of interest, etc. For example, instead of using the # symbol to designate in-page anchor links, the system designates the # symbol with a query string that describes the contents of the page (e.g., search results and other map zoom levels etc.). This is represented by the text after the "#" near the middle of the first line in the example shown in FIG. 9c. This function allows the user to copy and paste the URL of the current view, and email it to a friend who may then link to this exact view.

Figure 10A:
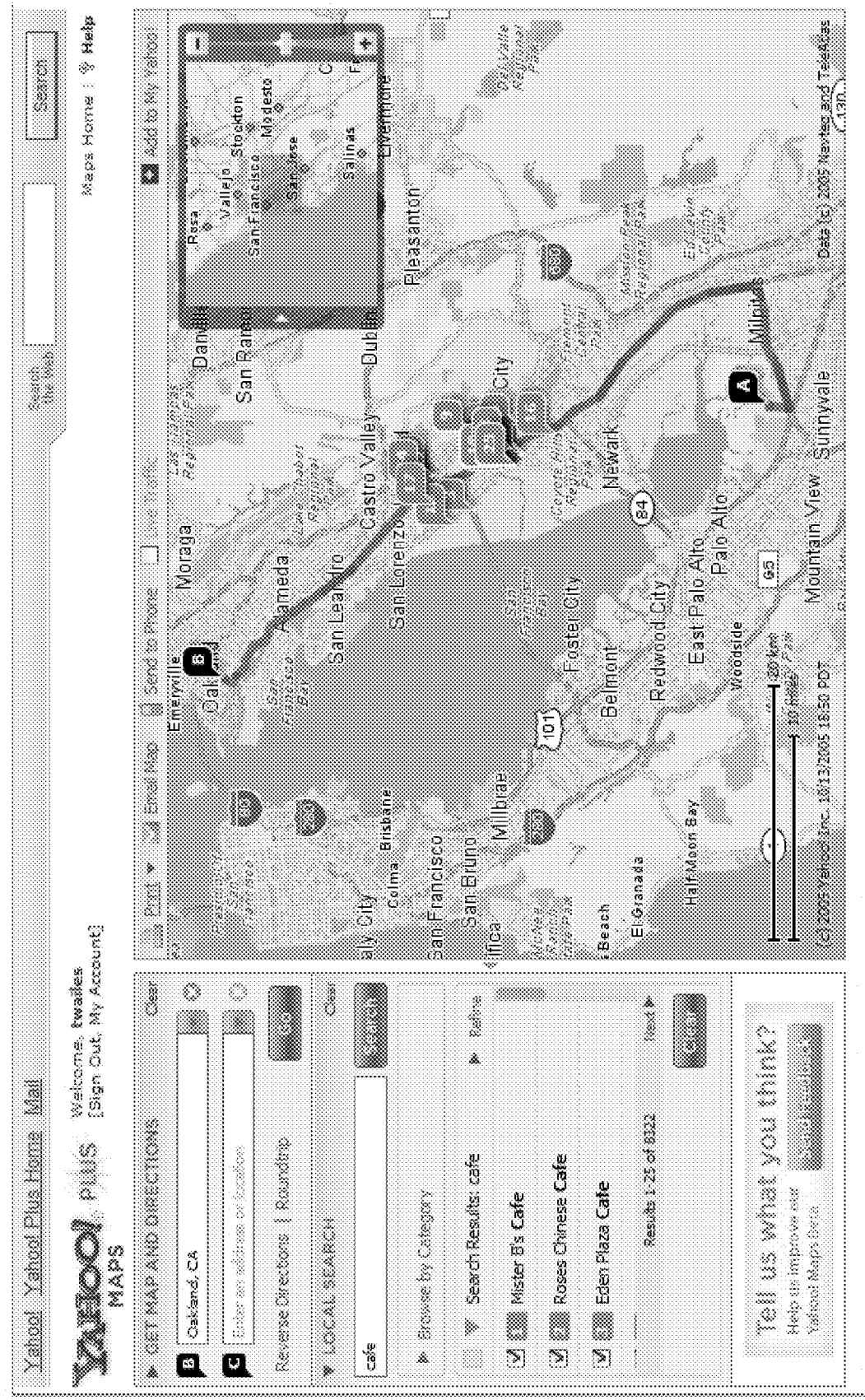
FIGS. 10a-10c illustrate a method for printing a map with directions and search results according to embodiments of the present invention.
Figure 10B:
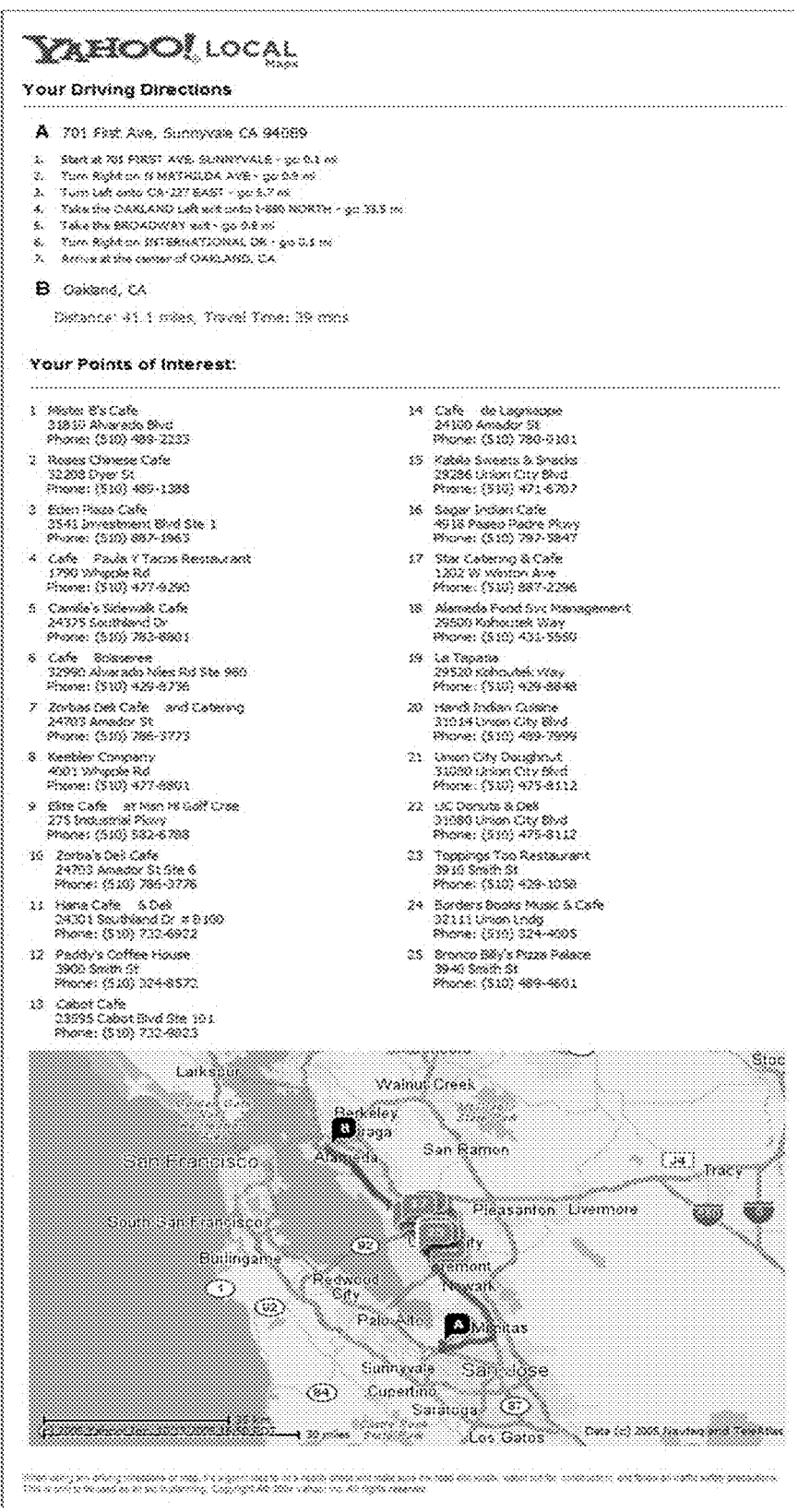
Figure 10C:
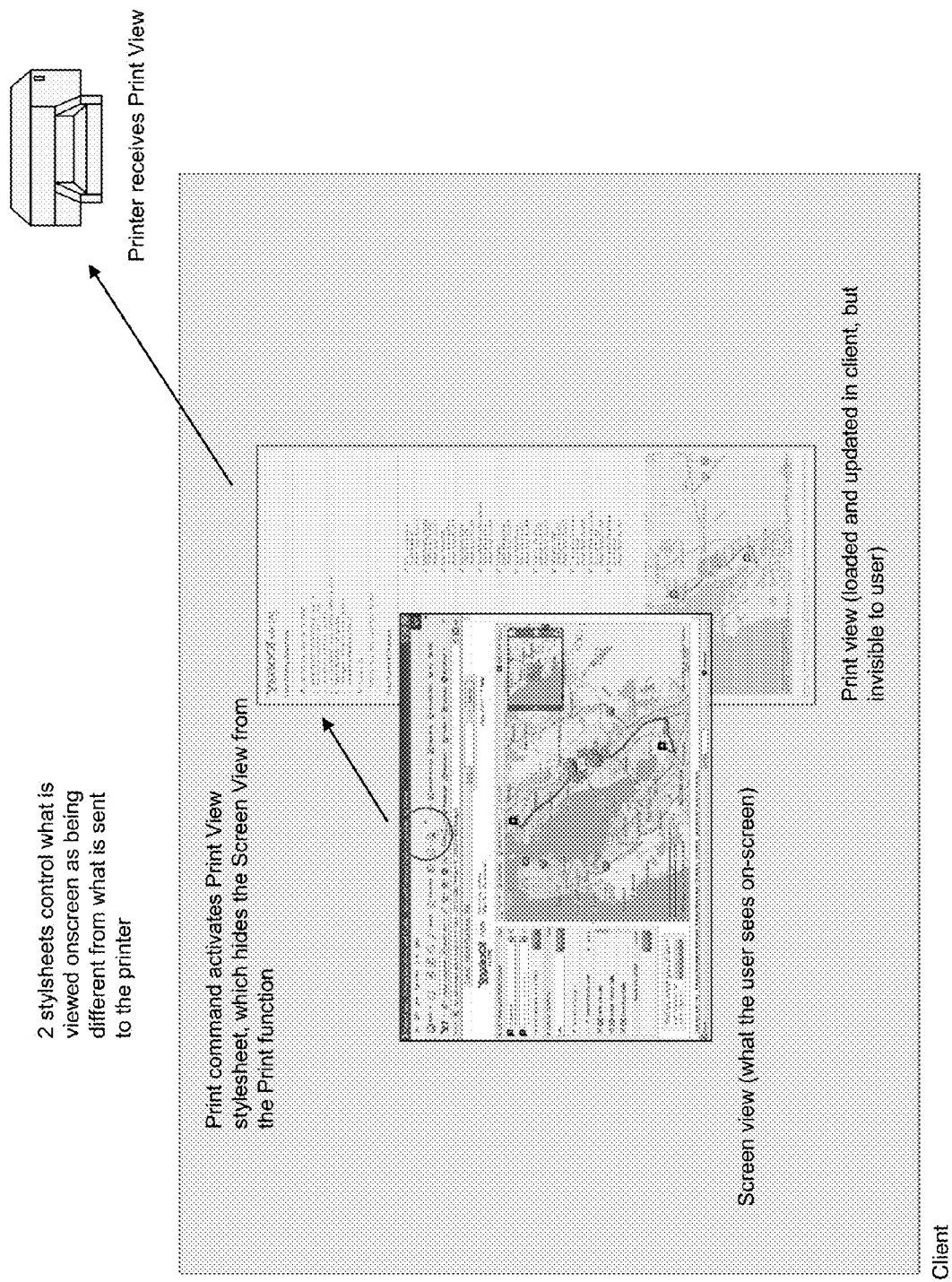

FIGS. 10a-10c illustrate a method for printing a map with directions and search results according to embodiments of the present invention. The interactive mapping system provides the capability of automatically sending a layout of the current map view (shown in FIG. 10a) and data that is optimized for printing. This occurs when the user selects the print function within the application or when the user chooses the print function from the browser. The printed version of the map and map data, as shown in FIG. 10b, is not what the user is seeing on the screen, such as a "print screen," but is a different layout specifically designed for printing. The print view of the same data is automatically sent to the printer. The user may also send a text-only variant.

In FIG. 10c, two stylesheets are used to control what is viewed onscreen as being different from what is sent to the printer. Stylesheet 1 designates the screen view and hides the print view; and stylesheet 2 designates the print view and is activated when the user initiates a print function either from within the application or from the browser print commands. This stylesheet also hides the screen view from the print function so that only the print view is sent to the printer.

Figure 11:
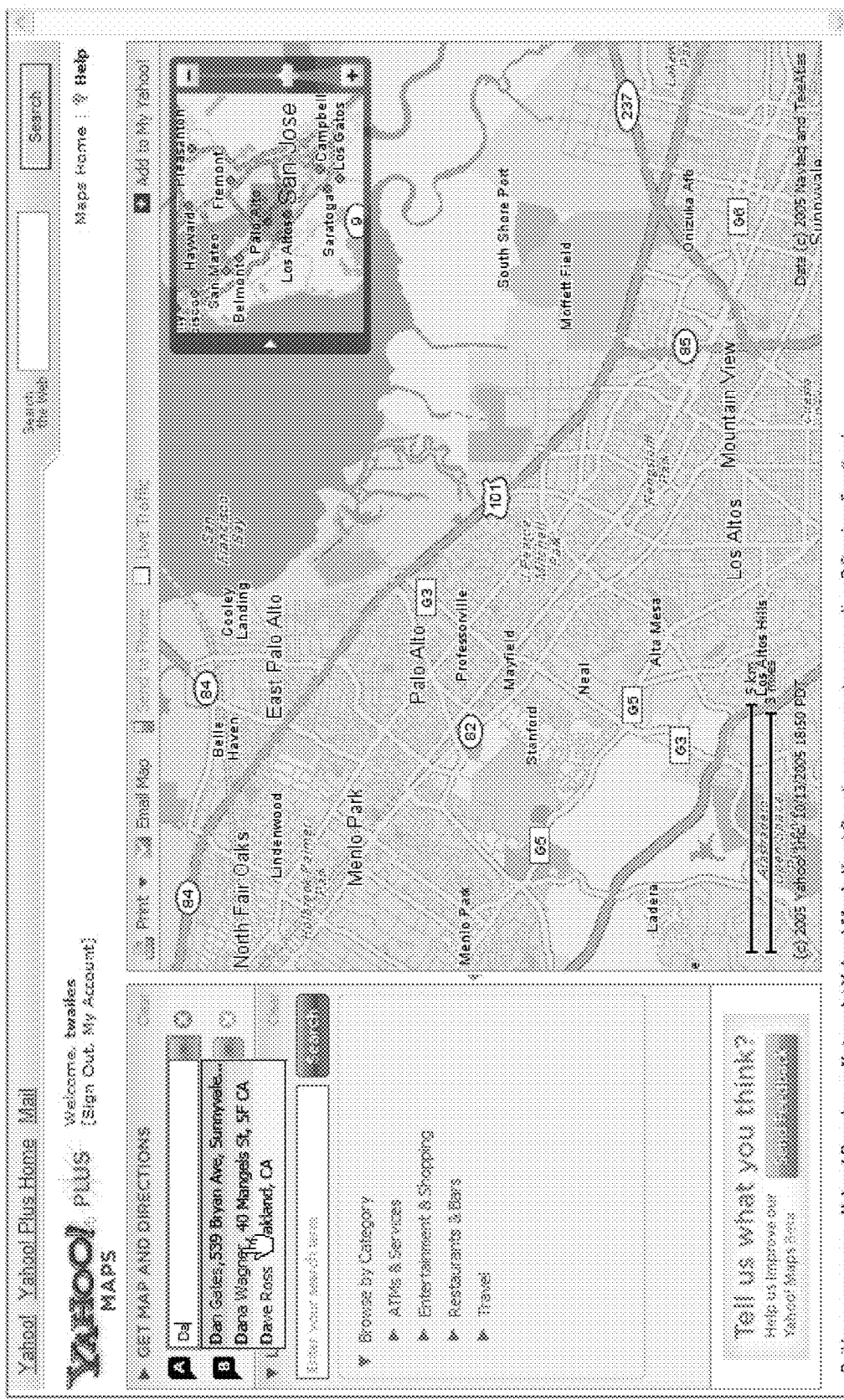
FIG. 11 illustrates a method for auto-completing an address entry using information from an address book according to an embodiment of the present invention.

FIG. 11 illustrates a method for auto-completing an address entry using information from an address book according to an embodiment of the present invention. The interactive mapping system provides the capability of displaying auto-complete selections drawn from the user's address book and the universal location manager (ULM). The ULM stores recently visited or previously saved locations. As the user types in letters or numbers of, for example, a person's name, nickname, or address, into a location box that match entries within his address book or ULM data, the system displays these matches for selection, as shown in FIG. 11. The user can choose to ignore or select these options. If the user selects one of these auto-complete options, the map then centers on the chosen address.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controller. Hence, references to specific functional units are only to be seen as references to suitable means for providing the described functionality rather than as indicative of a strict logical or physical structure or organization.

The invention can be implemented in any suitable form, including hardware, software, firmware, or any combination of them. The invention may optionally be implemented partly as computer software running on one or more data processors and/or digital signal processors. The elements and components of an embodiment of the invention may be physically, functionally, and logically implemented in any suitable way. Indeed the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method comprising:
   displaying a first map in a browser window for showing geographic context of a first general area, the browser window being visibly displayed on a display of a user device;
   displaying a second map in the browser window showing geographic context of a magnified portion of the first general area, wherein the second map is displayed larger than the first map;
   superimposing, via the user device, the first map onto the second map, wherein the second map is represented by a highlighted area in the first map, wherein the first map is automatically updated as a result of said superimposing; and
   facilitating navigating, via the user device, the first map using the highlighted area, wherein said navigating the first map comprises:
      panning the highlighted area across one or more locations in the first map in response to a user holding control of and dragging the highlighted area from the first general area to a different general area in the first map;
      during said panning, continue displaying the second map without changing the second map for as long as the user continues said holding and said dragging, wherein the different general area is displayed in the first map while the user continues said holding and said dragging;
      pausing said panning of the highlighted area at a second general area in the first map in response to the user stopping said dragging; and
      as a result of and only after said stopping said dragging and stopping said holding, changing the second map to display geographic context of a magnified portion of the second general area in the second map instead of the magnified portion of the first general area.

2. The method of claim 1 further comprising:
displaying points of interest inside the highlighted area of the first map and in the second map for assisting the user in navigating to the points of interest.

3. The method of claim 2 further comprising:
displaying, in the first map, additional points of interest that are in addition to the points of interest in the second map, the additional points of interest not included in the second map and outside the highlighted area of the first map, each of the additional points of interest marked in the first map by a respective marker.

4. The method of claim 1 further comprising:
mapping an address location to a corresponding business at the address location; and
displaying information about the business.

5. The method of claim 4, wherein the information about the business comprises:
name, phone number, hours of operation, photos, user ratings, user reviews, and links to other relevant information about the business.

6. The method of claim 1, wherein said displaying a first map comprises:
adjusting an aspect ratio of the first map in accordance with a corresponding aspect ratio of the browser window viewing area.

7. The method of claim 6, wherein said displaying a second map comprises:
adjusting an aspect ratio of the second map in accordance with the aspect ratio of the first map.

8. A computer program product for navigating a map in a browser window of a user device via the Internet, comprising:
a non-transitory medium storing computer programs for execution by one or more computer systems comprising at least one processor, the computer program product comprising:
code for displaying a first map for showing geographic context of a first general area;
code for displaying a second map for showing geographic context of a magnified portion of the first general area, wherein the second map is displayed larger than the first map;
code for superimposing the first map onto the second map, wherein the second map is represented by a highlighted area in the first map, wherein the first map is automatically updated as a result of said superimposing; and
code for facilitating navigating the first map using the highlighted area comprising:
code for panning the highlighted area across one or more locations in the first map in response to a user holding control of and dragging the highlighted area from the first general area to a different general area in the first map;
code for continuing to display, during said panning, the second map without changing the second map for as long as the user continues said holding and said dragging, wherein the different general area is displayed in the first map while the user continues said holding and said dragging;
code for pausing said panning of the highlighted area at a second general area in the first map in response to the user stopping said dragging, wherein the second map is not changed as long as the user continues said holding; and
code for redrawing, as a result of and only after said stopping said dragging and stopping said holding, the second map to display geographic context of a magnified portion of the second general area in the second map instead of the magnified portion of the first general area.

9. The computer program product of claim 8 further comprising:
code for displaying points of interest inside the highlighted area of the first map and in the second map for assisting the user in navigating to the points of interest.

10. The computer program product of claim 9 further comprising:
code for displaying, in the first map, additional points of interest that are in addition to the points of interest in the second map, the additional points of interest not included in the second map and outside the highlighted area of the first map, each of the additional points of interest marked in the first map by a respective marker.

11. The computer program product of claim 8 further comprising:
code for mapping an address location to a corresponding business at the address location; and
code for displaying information about the business.

12. The computer program product of claim 11, wherein the information about the business comprises:
name, phone number, hours of operation, photos, user ratings, user reviews, and links to other relevant information about the business.

13. The computer program product of claim 8, wherein the code for displaying a first map comprises:
adjusting an aspect ratio of the first map in accordance with a corresponding aspect ratio of the browser window viewing area.

14. The computer program product of claim 13, wherein the code for displaying a second map comprises:
code for adjusting an aspect ratio of the second map in accordance with the aspect ratio of the first map.

* * * * *